(12) United States Patent
Zhang et al.

(10) Patent No.: US 11,438,606 B2
(45) Date of Patent: Sep. 6, 2022

(54) COMPONENT-DEPENDENT SUB-BLOCK DIVIDING

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/071,357

(22) Filed: Oct. 15, 2020

(65) Prior Publication Data

US 2021/0029368 A1    Jan. 28, 2021

Related U.S. Application Data

(63) Continuation of application No. PCT/IB2019/055246, filed on Jun. 21, 2019.

(30) Foreign Application Priority Data

Jun. 21, 2018  (WO) ............... PCT/CN2018/092118
Nov. 10, 2018  (WO) ............... PCT/CN2018/114931

(51) Int. Cl.
*H04N 19/52*  (2014.01)
*H04N 19/55*  (2014.01)
(Continued)

(52) U.S. Cl.
CPC ......... *H04N 19/186* (2014.11); *H04N 19/119* (2014.11); *H04N 19/136* (2014.11);
(Continued)

(58) Field of Classification Search
CPC .. H04N 19/139; H04N 19/176; H04N 19/186; H04N 19/52; H04N 19/54
See application file for complete search history.

(56) References Cited

U.S. PATENT DOCUMENTS 7,529,302 B2     5/2009  Mukerjee et al.
8,184,715 B1 *   5/2012  Rosenzweig ........ H04N 19/436
                                                       375/240.24
(Continued)

FOREIGN PATENT DOCUMENTS

CA    3025490 A1    12/2017
CA    3037685 A1    3/2018
(Continued)

OTHER PUBLICATIONS

Non-Final Office Action from U.S. Appl. No. 17/099,042 dated Dec. 31, 2020.
(Continued)

*Primary Examiner* — Mohammad J Rahman
(74) *Attorney, Agent, or Firm* — Perkins Coie LLP

(57) ABSTRACT

Devices, systems and methods for sub-block based prediction are described. In a representative aspect, a method for video encoding includes partitioning, based on a first rule, a luma component of a block of video data into a first set of sub-blocks. The method also includes partitioning, based on a second rule, a first chroma component of the block of video data into a second set of sub-blocks. The first and the second set of sub-blocks include different numbers of sub-blocks. The method also includes performing a subsequent motion prediction based on the first and the second set of sub-blocks.

19 Claims, 18 Drawing Sheets

(51) Int. Cl.
  *H04N 19/176* (2014.01)
  *H04N 19/186* (2014.01)
  *H04N 19/119* (2014.01)
  *H04N 19/136* (2014.01)

(52) U.S. Cl.
  CPC .......... *H04N 19/176* (2014.11); *H04N 19/52* (2014.11); *H04N 19/55* (2014.11)

(56) References Cited

U.S. PATENT DOCUMENTS

| | | |
|---|---|---|
| 8,462,846 B2 | 6/2013 | Zhang |
| 9,294,777 B2 | 3/2016 | Wang |
| 9,374,595 B2 | 6/2016 | Kim et al. |
| 9,521,425 B2 | 12/2016 | Chen et al. |
| 9,615,089 B2 | 4/2017 | Fartukov et al. |
| 9,667,996 B2 | 5/2017 | Chen et al. |
| 9,674,542 B2 | 6/2017 | Chen et al. |
| 9,762,927 B2 | 9/2017 | Chen et al. |
| 9,900,593 B2 | 2/2018 | Xiu et al. |
| 9,948,930 B2 | 4/2018 | Panusopone et al. |
| 9,955,186 B2 | 4/2018 | Chon et al. |
| 10,045,014 B2 | 8/2018 | Zhang et al. |
| 10,142,655 B2 | 11/2018 | Lin et al. |
| 10,298,950 B2 | 5/2019 | Wang et al. |
| 10,362,330 B1 | 7/2019 | Li et al. |
| 10,404,990 B2 | 9/2019 | Hendry et al. |
| 10,419,763 B2 | 9/2019 | Huang et al. |
| 10,448,010 B2 | 10/2019 | Chen et al. |
| 10,484,686 B2 | 11/2019 | Xiu et al. |
| 10,523,964 B2 | 12/2019 | Chuang et al. |
| 10,560,712 B2 | 2/2020 | Zou et al. |
| 10,701,366 B2 | 6/2020 | Chen et al. |
| 10,708,592 B2 | 7/2020 | Dong et al. |
| 10,757,417 B2 | 8/2020 | Zhang et al. |
| 10,778,999 B2 | 9/2020 | Li et al. |
| 10,779,002 B2 | 9/2020 | Chen et al. |
| 10,785,494 B2 | 9/2020 | Chien et al. |
| 10,805,630 B2 | 10/2020 | Li et al. |
| 10,841,609 B1 | 11/2020 | Liu et al. |
| 10,904,565 B2 | 1/2021 | Chuang et al. |
| 11,172,196 B2 | 11/2021 | Zhang et al. |
| 11,197,003 B2 | 12/2021 | Zhang et al. |
| 11,197,007 B2 | 12/2021 | Zhang et al. |
| 11,202,065 B2 | 12/2021 | Zhang et al. |
| 11,202,081 B2 | 12/2021 | Zhang et al. |
| 2007/0192762 A1 | 8/2007 | Eichenberger et al. |
| 2011/0002386 A1 | 1/2011 | Zhang |
| 2011/0194609 A1 | 8/2011 | Rusert et al. |
| 2011/0200107 A1 | 8/2011 | Ryu |
| 2012/0219216 A1 | 8/2012 | Sato |
| 2012/0287999 A1 | 11/2012 | Li et al. |
| 2012/0320984 A1 | 12/2012 | Zhou et al. |
| 2013/0101041 A1 | 4/2013 | Fishwick et al. |
| 2013/0128976 A1 | 5/2013 | Koyama et al. |
| 2013/0182755 A1 | 7/2013 | Chen et al. |
| 2013/0229485 A1 | 9/2013 | Rusanovskyy et al. |
| 2013/0329007 A1 | 12/2013 | Zhang et al. |
| 2014/0086325 A1 | 3/2014 | Chen et al. |
| 2014/0286408 A1 | 9/2014 | Zhang et al. |
| 2014/0294066 A1 | 10/2014 | Kondo |
| 2014/0334551 A1 | 11/2014 | Kim et al. |
| 2015/0023423 A1 | 1/2015 | Zhang et al. |
| 2015/0181216 A1 | 6/2015 | Zhang et al. |
| 2015/0249828 A1* | 9/2015 | Rosewarne .......... H04N 19/136 375/240.02 |
| 2015/0312588 A1 | 10/2015 | Yamamoto et al. |
| 2015/0373350 A1 | 12/2015 | Hendry et al. |
| 2015/0373357 A1 | 12/2015 | Pang et al. |
| 2015/0373362 A1 | 12/2015 | Pang et al. |
| 2016/0057420 A1 | 2/2016 | Pang et al. |
| 2016/0073132 A1 | 3/2016 | Zhang et al. |
| 2016/0100189 A1 | 4/2016 | Pang et al. |
| 2016/0142729 A1 | 5/2016 | Wang et al. |
| 2016/0366441 A1 | 12/2016 | An et al. |
| 2016/0373756 A1 | 12/2016 | Yu et al. |
| 2017/0054996 A1 | 2/2017 | Xu et al. |
| 2017/0142418 A1 | 5/2017 | Li et al. |
| 2017/0223378 A1 | 8/2017 | Tao et al. |
| 2017/0238005 A1 | 8/2017 | Chien et al. |
| 2017/0238011 A1 | 8/2017 | Pettersson et al. |
| 2017/0272748 A1 | 9/2017 | Seregin et al. |
| 2017/0272782 A1 | 9/2017 | Li et al. |
| 2017/0289566 A1 | 10/2017 | He et al. |
| 2017/0310990 A1 | 10/2017 | Hsu |
| 2017/0332095 A1 | 11/2017 | Zou et al. |
| 2017/0332099 A1 | 11/2017 | Lee et al. |
| 2017/0339404 A1 | 11/2017 | Panusopone et al. |
| 2017/0339405 A1 | 11/2017 | Wang et al. |
| 2018/0041762 A1 | 2/2018 | Ikai et al. |
| 2018/0048889 A1* | 2/2018 | Zhang .............. H04N 19/159 |
| 2018/0054628 A1 | 2/2018 | Pettersson et al. |
| 2018/0063553 A1 | 3/2018 | Zhang et al. |
| 2018/0098062 A1 | 4/2018 | Li et al. |
| 2018/0098087 A1 | 4/2018 | Li et al. |
| 2018/0124394 A1 | 5/2018 | Xu et al. |
| 2018/0131952 A1 | 5/2018 | Xiu et al. |
| 2018/0184117 A1 | 6/2018 | Chen et al. |
| 2018/0192069 A1 | 7/2018 | Chen et al. |
| 2018/0192072 A1 | 7/2018 | Chen et al. |
| 2018/0199056 A1* | 7/2018 | Sato ...................... H04N 19/122 |
| 2018/0247396 A1* | 8/2018 | Pouli ...................... G06T 5/008 |
| 2018/0270500 A1* | 9/2018 | Li ........................ H04N 19/54 |
| 2018/0278951 A1 | 9/2018 | Seregin ................. H04N 19/44 |
| 2018/0288441 A1* | 10/2018 | Zhang .................. H04N 19/14 |
| 2018/0324454 A1 | 11/2018 | Lin et al. |
| 2018/0332298 A1 | 11/2018 | Liu et al. |
| 2018/0376166 A1 | 12/2018 | Chuang et al. |
| 2019/0037231 A1 | 1/2019 | Ikai et al. |
| 2019/0052886 A1 | 2/2019 | Chiang et al. |
| 2019/0058897 A1 | 2/2019 | Han et al. |
| 2019/0068977 A1* | 2/2019 | Zhang .................. H04N 19/186 |
| 2019/0075293 A1* | 3/2019 | Lim ...................... H04N 19/18 |
| 2019/0104303 A1* | 4/2019 | Xiu ...................... H04N 19/182 |
| 2019/0124332 A1* | 4/2019 | Lim ...................... H04N 19/51 |
| 2019/0158866 A1 | 5/2019 | Kim |
| 2019/0191171 A1* | 6/2019 | Ikai ...................... H04N 19/51 |
| 2019/0222859 A1 | 7/2019 | Chuang et al. |
| 2019/0246128 A1 | 8/2019 | Xu et al. |
| 2019/0246143 A1 | 8/2019 | Zhang et al. |
| 2019/0273943 A1* | 9/2019 | Zhao .................... H04N 19/176 |
| 2019/0306502 A1 | 10/2019 | Gadde et al. |
| 2019/0320181 A1 | 10/2019 | Chen et al. |
| 2019/0335170 A1* | 10/2019 | Lee ...................... H04N 19/52 |
| 2019/0342547 A1* | 11/2019 | Lee ...................... H04N 19/46 |
| 2019/0364295 A1* | 11/2019 | Li ........................ H04N 19/184 |
| 2019/0373261 A1 | 12/2019 | Eglimez et al. |
| 2019/0387250 A1 | 12/2019 | Boyce et al. |
| 2020/0021837 A1 | 1/2020 | Ikai et al. |
| 2020/0045310 A1 | 2/2020 | Chen et al. |
| 2020/0045311 A1* | 2/2020 | Yoo ...................... H04N 19/70 |
| 2020/0053364 A1 | 2/2020 | Seo |
| 2020/0084441 A1 | 3/2020 | Lee et al. |
| 2020/0084454 A1 | 3/2020 | Liu et al. |
| 2020/0099951 A1 | 3/2020 | Hung et al. |
| 2020/0112741 A1 | 4/2020 | Han |
| 2020/0120334 A1 | 4/2020 | Xu et al. |
| 2020/0137398 A1 | 4/2020 | Zhao et al. |
| 2020/0145688 A1 | 5/2020 | Zou et al. |
| 2020/0154127 A1 | 5/2020 | Lee |
| 2020/0169726 A1 | 5/2020 | Kim et al. |
| 2020/0213594 A1 | 7/2020 | Liu et al. |
| 2020/0213612 A1 | 7/2020 | Liu et al. |
| 2020/0213622 A1 | 7/2020 | Xu et al. |
| 2020/0221077 A1 | 7/2020 | Park et al. |
| 2020/0221110 A1 | 7/2020 | Chien et al. |
| 2020/0221120 A1 | 7/2020 | Robert et al. |
| 2020/0267408 A1 | 8/2020 | Lee et al. |
| 2020/0275120 A1 | 8/2020 | Lin et al. |
| 2020/0296380 A1 | 9/2020 | Aono et al. |
| 2020/0296382 A1* | 9/2020 | Zhao .................... H04N 19/119 |
| 2020/0296415 A1 | 9/2020 | Chen et al. |
| 2020/0336738 A1 | 10/2020 | Xiu et al. |
| 2020/0351505 A1 | 11/2020 | Seo |

(56) References Cited

U.S. PATENT DOCUMENTS

| | | |
|---|---|---|
| 2020/0359029 A1 | 11/2020 | Liu et al. |
| 2020/0374543 A1 | 11/2020 | Liu et al. |
| 2020/0374544 A1 | 11/2020 | Liu et al. |
| 2020/0382771 A1 | 12/2020 | Liu et al. |
| 2020/0382795 A1 | 12/2020 | Zhang et al. |
| 2020/0382807 A1 | 12/2020 | Liu et al. |
| 2020/0396453 A1 | 12/2020 | Zhang et al. |
| 2020/0396462 A1 | 12/2020 | Zhang et al. |
| 2020/0396465 A1 | 12/2020 | Zhang et al. |
| 2020/0404255 A1 | 12/2020 | Zhang et al. |
| 2020/0404260 A1 | 12/2020 | Zhang et al. |
| 2020/0413048 A1 | 12/2020 | Zhang et al. |
| 2021/0006780 A1 | 1/2021 | Zhang et al. |
| 2021/0006787 A1 | 1/2021 | Zhang et al. |
| 2021/0029356 A1 | 1/2021 | Zhang et al. |
| 2021/0029362 A1 | 1/2021 | Zhang et al. |
| 2021/0037240 A1 | 2/2021 | Zhang et al. |
| 2021/0037256 A1 | 2/2021 | Zhang et al. |
| 2021/0051339 A1 | 2/2021 | Liu et al. |
| 2021/0067783 A1 | 3/2021 | Liu et al. |
| 2021/0076050 A1 | 3/2021 | Zhang et al. |
| 2021/0076063 A1 | 3/2021 | Liu et al. |
| 2021/0092379 A1 | 3/2021 | Zhang et al. |
| 2021/0092435 A1 | 3/2021 | Liu et al. |
| 2021/0105482 A1 | 4/2021 | Zhang et al. |
| 2021/0152846 A1 | 5/2021 | Zhang et al. |
| 2021/0203958 A1 | 7/2021 | Zhang et al. |
| 2021/0218980 A1 | 7/2021 | Zhang et al. |
| 2021/0227234 A1 | 7/2021 | Zhang et al. |
| 2021/0352302 A1 | 11/2021 | Zhang et al. |
| 2021/0392341 A1 | 12/2021 | Zhang et al. |

FOREIGN PATENT DOCUMENTS

| | | |
|---|---|---|
| CN | 1672174 A | 9/2005 |
| CN | 1710959 A | 12/2005 |
| CN | 1777283 A | 5/2006 |
| CN | 101605255 A | 12/2009 |
| CN | 101895751 A | 11/2010 |
| CN | 102577388 A | 7/2012 |
| CN | 104053005 A | 9/2014 |
| CN | 104221376 A | 12/2014 |
| CN | 104904207 A | 9/2015 |
| CN | 105306944 A | 2/2016 |
| CN | 105532000 A | 4/2016 |
| CN | 105678808 A | 6/2016 |
| CN | 105723713 A | 6/2016 |
| CN | 105917650 A | 8/2016 |
| CN | 106303543 A | 1/2017 |
| CN | 106416245 A | 2/2017 |
| CN | 106537915 A | 3/2017 |
| CN | 106559669 A | 4/2017 |
| CN | 106688232 A | 5/2017 |
| CN | 107079161 A | 8/2017 |
| CN | 107113424 A | 8/2017 |
| CN | 107113442 A | 8/2017 |
| CN | 107211156 A | 9/2017 |
| CN | 107426568 A | 12/2017 |
| CN | 107534778 A | 1/2018 |
| CN | 107852490 A | 3/2018 |
| CN | 107925775 A | 4/2018 |
| CN | 107979756 A | 5/2018 |
| CN | 108012153 A | 5/2018 |
| CN | 108028929 A | 5/2018 |
| CN | 108432250 A | 8/2018 |
| CN | 108632629 A | 10/2018 |
| GB | 2539213 A | 12/2016 |
| JP | H08186825 A | 7/1996 |
| JP | 2007272733 A | 10/2007 |
| JP | 2011077761 A | 4/2011 |
| TW | 201540047 A | 10/2015 |
| TW | 201709738 A | 3/2017 |
| TW | 201832557 A | 9/2018 |
| WO | 2000065829 A1 | 11/2000 |
| WO | 2009080133 A1 | 7/2009 |
| WO | 2016048834 A1 | 3/2016 |
| WO | 2016057701 A1 | 4/2016 |
| WO | 2016091161 A1 | 6/2016 |
| WO | 2016138513 A1 | 9/2016 |
| WO | 2016183224 A1 | 11/2016 |
| WO | 2017130696 A1 | 3/2017 |
| WO | 2017118411 A1 | 7/2017 |
| WO | 2017133661 A1 | 8/2017 |
| WO | 2017157264 A1 | 9/2017 |
| WO | 2017157281 A1 | 9/2017 |
| WO | 2017165391 A1 | 9/2017 |
| WO | 2017188509 A1 | 11/2017 |
| WO | 2017195554 A1 | 11/2017 |
| WO | 2017197126 A1 | 11/2017 |
| WO | 2017197146 A1 | 11/2017 |
| WO | 2017206803 A1 | 12/2017 |
| WO | 2018047668 A1 | 3/2018 |
| WO | 2018066241 A1 | 4/2018 |
| WO | 2018067823 A1 | 4/2018 |
| WO | 2018097692 A2 | 5/2018 |
| WO | 2018097693 A3 | 7/2018 |
| WO | 2018184589 A1 | 10/2018 |

OTHER PUBLICATIONS

Notice of Allowance from U.S. Appl. No. 17/071,412 dated Jan. 7, 2021.

Hsiao et al. "CE4.4.12: Pairwise Average Candidates," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0090, 2019.

Hsu et al. "Description of SDR Video Coding Technology Proposal by MediaTek," Joint Video Experts Team (JVET) of ITU-T SG 16 WP 3 and Iso/IEC JTC 1/SC 29/WG 11, 10th Meeting, San Diego, US, Apr. 10-20, 2018, document JVET-J0018. 2018.

Lee et al. "Unified Condition for Affine Merge and Affine Inter Mode," Joint Video Exploration Team (JVET) of ITU-T SG 16 WP 3 and ISO/IEC JTC 1/SC 29/WG 11, 5th Meeting, Geneva, CH, Jan. 12-20, 2017, JVET-E0039, 2017.

Liao et al. "CE10.1.b: Triangular Prediction Unit Mode," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0124. 2018.

Zhang et al. "CE4-Related: Simplified Affine Prediction," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0103. 2018.

Zhang et al. "CE4: Affine Prediction with 4x4 Sub-blocks for Chroma Components (Test 4.1.16)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0265, 2018.

Zhang et al. "CE3-Related: Modified Chroma Derived Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0272, 2018.

Zhang et al. "Adaptive Motion Vector Resolution Rounding Align," Joint Video Experts Team (JVET) of ITU-T SG 16 WP 3 and ISO/IEC JTC 1/SC 2/WG 11, 12th Meeting, Macao, CN, Oct. 3-12, 2018, document JVET-L0377, 2018.

International Search Report and Written Opinion from PCT/CN2019/117116 dated Jan. 2, 2020 (9 pages).

International Search Report and Written Opinion from PCT/CN2019/117118 dated Feb. 5, 2020 (9 pages).

International Search Report and Written Opinion from PCT/CN2019/117119 dated Jan. 23, 2020 (9 pages).

International Search Report and Written Opinion from PCT/IB2019/055244 dated Nov. 18, 2019 (18 pages).

International Search Report and Written Opinion from PCT/IB2019/055246 dated Nov. 7, 2019 (18 pages).

International Search Report and Written Opinion from PCT/IB2019/055247 dated Nov. 7, 2019 (21 pages).

Advisory Action from U.S. Appl. No. 17/074,892 dated Aug. 4, 2021.

(56) References Cited

OTHER PUBLICATIONS

Alshin et al. "Bi-Directional Optical Flow for Improving Motion Compensation," 28th Picture Coding Symposium, PCS2010, Dec. 8, 2010, Nagoya, Japan, pp. 422-425.

Bross et al. "Versatlie Video Coding (Draft 2)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1001, 2018.

Bross et al. "Versatile Video Coding (Draft 4)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M1001, 2019.

Bross et al. "Versatile Video Coding (Draft 5)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N1001, 2019.

Chen et al. "EE3: Generalized Bi-Prediction," Joint Video Exploration Team (JVET) of ITU-T SG 16 WP 3 and ISO/IEC JTC 1/SC 29/WG 11, 4th Meeting, Chengdu, CN, Oct. 15-21, 2016, document JVET-D0102, 2016.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting, Torino, IT, Jul. 13-21, 2017, document JVET-G1001, 2017.

Chen et al. "Description of SDR, HDR and 360 degree Video Coding Technology Proposal by Qualcomm and Technicolor—low and high complexity versions," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0021, 2018.

Chen et al. "Description of SDR, HDR and 360 degree Video Coding Technology Proposal by Huawei, GoPro, HiSilicon, and Samsung," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0025, 2018.

Chen et al. "DMVR Extension baed on Template Matching," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0057, 2018.

Chien et al. "Modification of Merge Candidate Derivation," Joint Video Exploration Team (JVET) of ITU-T SG 16 WP 3 and ISO/IEC JTC 1/SC 29/WG 11, 2nd Meeting, San Diego, USA, Feb. 20-26, 2016, document JVET-B0058, 2016.

JEM-7.0: https://jvet.hhi.fraunhofer.de/svn/svn_HMJEMSoftware/tags/ HM-16.6-JEM-7.0. (only website).

Han et al. "CE4-Related: Modification on Merge List," Joint Video Exploration Team (JVET) of ITU-T SG 16 WP 3 and ISO/IEC JTC 1/SC 29/WG 11, 13th Meeting, Marrakech, MA, Jan. 9-18, 2019, document JVET-M0127, 2019.

He et al. "Non-SCCE1: Improved Intra Block Copy Coding with Block Vector Derivation," Joint Collaborative Team on Video Coding (JCT-VC) of ITU-T SG 16 WP 3 and ISO/IEC JTC 1/SC 29/WG 11, 18th Meeting, Sapporo, JP, Jun. 30-Jul. 9, 2017, document JCTVC-R0165, 2014.

"High Efficiency Video Coding" Series H: Audiovisual and Multimedia Systems: Infrastructure of Audiovisual Services—Coding of Moving Video, ITU-T, H.265, 2018.

Hsiao et al. "CE4.2.8: Merge Mode Enhancement," Joint Video Experts Team (JVET of ITU-T SG 16 WP 3 and ISO/IEC JTC 1/SC 29/WG 11, 11th Meeting: Ljubljana, SI, Jul. 10-18, 2018, document JVET-K0245, 2018.

H.265/HEVC, https://www.itu.int/rec/T-REC-H.265.

Li et al. "Affine Deformation Model Based Intra Block Copy for Intra Frame Coding," 2020, Institute of Information and Communication Engineering, Zhejiang University.

Li et al. "Multi-Type-Tree." Joint Video Exploration Team (JVET), of ITU-T SG 16 WP 3 and ISO/IEC JTC 1/SC 29/WG 11, 4th Meeting: Chengdu, CN, Oct. 15-21, 2016, document JVET-D0117rl, 2016.

Li et al. "Non-CE4: Harmonization between HMVP and Gbi," Joint Video Experts Team (JVET) of ITU-T SG 16 WP 3 and ISO/IEC JTC 1/SC 29/WG 11, 13th Meeting: Marrakech, MA, Jan. 9-18, 2019, document JVET-M0264, 2019.

Li et al. "Adaptive Motion Vector Resolution for Screen Content," Joint Collaborative Team on Video Coding (JCT-VC) of ITU-T SG 16 WP 3 and ISO/IEC JTC 1/SC 29/WG 11, 19th Meeting, Strasbourg, FR, Oct. 17-24, 2014, document JCTVC-S0085, 2014.

Li et al. "Combining Directional Intra Prediction and Intra Block Copy with Block Partitioning for HEVC," 2016 IEEE International Conference on Image Processing (ICIP), Phoenix, AZ, USA, 2016, pp. 524-528.

Luthra et al. Overview of the H.264/AVC Video Coding Standard, Proc. SPIE, 5203, Applications of Digital Image Processing, Nov. 19, 2003, Optical Science and Technology, SPIE 48th annutal Meeting, San Diego, CA, US, 2003.

Su et al. "CE4.4.1: Generalized Bi-Prediction for Intercoding," Joint Video Exploration Team of ISO/IEC JTC 1/SC 29/WG 11 and ITU-T SG 16, Ljubljana, Jul. 11-18, 2018, document No. JVET-K0248, 2018.

Sullivan et al. "Overview of the High Efficiency Video Coding (HEVC) Standard," IEEE Transactions on Circuits and Systems for Video Technology, Dec. 2012, 22(12):1649-1668.

Sullivan et al. "Meeting Report of the 18th Meeting of the Joint Collaborative Team on Video Coding (JCT-VC), Sapporo, JP, Jun. 30-Jul. 9, 2014", Joint Collaborative Team on Video Coding (JCT-VC) of ITU-T SG16 WP3 and ISO/IEC JTC1/SC29/WG11, 18th Meeting: Sapporo, JP, Jun. 30-Jul. 9, 2014, JCTVC-R_Notes_d, 2014.

Toma et al. "Description of SDR Video Coding Technology Proposal by Panasonic," Joint Video Experts Team (JVET) of ITU-T SG 16 WP 3 and ISO/IEC JTC 1/SC 29/WG 11, 10th Meetingmm San Diego, US, Apr. 10-20, 2018, document JVET-J0020, 2018.

Van Der Auwera et al. "Description of Core Experiment 3: Intra Prediction and Mode Coding," Joint Video Experts Team (JVET) of ITU-T SG 16 WP 3 and ISO/IEC JTC 1/SC 29/WG 11, 10th Meeting, San Diego, USA, Apr. 10-20, 2018. document JVET-J1023, 2018.

Xu et al. "Intra Block Copy in HEVC Screen Content Coding Extensions," IEEE Journal on Emerging and Selected Topics in Circuits and Systems, Dec. 2016, 6(4):409-419.

Xu et al. "CE8-Related Combination Test of JVET-N0176/JVET-N0317/JVET-N0382 on Simplification of IBC Vector Prediction," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0843, 2019.

Yang et al. "Description of Core Experiment 4 (CE4): Inter Prediction and Motion Vector Coding," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1024, 2018.

Zhang et al. "Rotate Intra Block Copy for Still Image Coding," 2015 IEEE International Conference on Image Processing (ICIP), IEEE, Sep. 27, 2015, pp. 4102-4106.

Zhang et al. "CE4-related: History-based Motion Vector Prediction", Joint Video Experts Team (JVET) of ITU-T SG 16 WP 3 and ISO/IEC JTC 1/SC 29/WG 11, 11th Meeting, Ljubljana, SI, (Jul. 10-18, 2018), Document JVET-K0104, 2018.

Zhang et al. "CE4.2.14: Planar Motion Vector Prediction," Joint Video Experts Team (JVET) of ITU-T SG 16 and WP 3 and ISO/IEC JTC 1/SC 29/WG 11, 11th Meeting: Ljubljaba, SI, Jul. 10-18, 2018, document JVET-K0135, 2018.

Zhang et al. "BoG Report on CE4 Related Contributions," Joint Video Experts Team (JVET) of ITU-T SG 16 WP 3 and ISO/IEC JTC 1/SC 29/WG 11, 13th Meeting: Marrakech, MA, Jan. 9-18, 2019, document JVET-M0843, 2019.

Zhang et al. "On Adaptive Motion Vector Resolution," Joint Collaborative Team on Video Coding (JCT-VC) of ITU-T SG 16 WP 3 and ISO/IEC JTC 1/SC 29/WG 11, 20th Meeting, Geneva, CH, Feb. 10-18, 2015, document JCTVC-T0059, 2015.

(56) References Cited

OTHER PUBLICATIONS

Zou et al. "Improved Affine Motion Prediction," Joint Video Exploration Team (JVET) of ITU-T SG 16 WP3 and ISO/IEC JTC 1/SC 29/WG 11, 3rd Meeting, Geneva, CH, May 26.-Jun. 1, 2016, document JVET-C0062, 2016.
Zhou et al. "Spatial-Temporal Merge Mode (Non Subblock STMVP)," Joint Video Exploration Team (JVET) of ITU-T SG 16 WP 3 and ISO/IEC JTC 1/SC 29/WG 11, 11th Meeting: Ljubljana, SI, Jul. 10-18, 2018, document JVET-K0532, and JVET-K0161, 2018.
International Search Report and Written Opinion from PCT/IB2019/054602 dated Aug. 21, 2019 (17 pages).
International Search Report and Written Opinion from PCT/IB2019/054604 dated Sepember 26, 2019 (17 pages).
International Search Report and Written Opinion from PCT/IB2019/054611 dated Aug. 29, 2019 (88 pages).
International Search Report and Written Opinion from PCT/IB2019/054612 dated Sep. 26, 2019 (17 pages).
International Search Report and Written Opinion from PCT/IB2019/054614 dated Aug. 27, 2019 (14 pages).
International Search Report and Written Opinion from PCT/IB2019/054650 dated Oct. 28, 2019 (20 pages).
International Search Report and Written Opinion from PCT/IB2019/054652 dated Sep. 27, 2019 (18 pages).
International Search Report and Written Opinion from PCT/IB2019/054654 dated Aug. 27, 2019 (85 pages).
International Search Report and Written Opinion from PCT/IB2019/058078 dated Mar. 3, 2020(20 pages).
International Search Report and Written Opinion from PCT/IB2019/058079 dated Mar. 3, 2020(26 pages).
International Search Report and Written Opinion from PCT/IB2019/058081 dated Mar. 25, 2020(21 pages).
Non-Final Office Action from U.S. Appl. No. 17/019,629 dated Nov. 13, 2020.
Non-Final Office Action from U.S. Appl. No. 17/011,157 dated Nov. 17, 2020.
Non-Final Office Action from U.S. Appl. No. 17/031,451 dated Dec. 4, 2020.
Notice of Allowance from U.S. Appl. No. 17/011,131 dated Dec. 10, 2020.
Non-Final Office Action from U.S. Appl. No. 17/074,842 dated Dec. 23, 2020.
Non-Final Office Action from U.S. Appl. No. 17/074,892 dated Dec. 24, 2020.
Non-Final Office Action from U.S. Appl. No. 17/005,521 dated Jan. 7, 2021.
Final Office Action from U.S. Appl. No. 17/019,629 dated Feb. 26, 2021.
Non-Final Office Action from U.S. Appl. No. 17/161,391 dated Mar. 25, 2021.
Final Office Action from U.S. Appl. No. 17/005,521 dated Apr. 26, 2021.
Final Office Action from U.S. Appl. No. 17/161,391 dated Jul. 14, 2021.
Final Office Action from U.S. Appl. No. 17/031,451 dated Dec. 21, 2021.
Office Action from Indian Patent Application No. 202127002718 dated Jan. 6, 2022.
Huang, Wanzhang, "Research on Side Information Generation of Distributed Video Coding," South China University of Technology, Guangzhou, China, 2012.
Jang et al. "Non-CE8: Modification on SbTMVP Process Regarding with CPR," Joint Video Experts Team (JVET) of ITU-T SG 16 WP3 and ISO/IEC JTC 1/SC 29/WG 11, 13th Meeting, Marrakech, MA, Jan. 9-18, 2019, document JVET-M0335, 2019.
Lai et al. "CE8-Related: Clarification on Interaction Between CPR and other Inter Coding Tools," Joint Video Experts Teram (JVET) of ITU-T SG 16 WP3 and ISO/IEC JTC 1/SC 29/WG 11, 13th Meeting, Marrakech, MA, Jan. 9-18, 2019, document JVET-M0175, 2019.
Xu et al. "Non-CE8: Mismatch Between Text Specification and Reference Software on ATMVP Candidate Derivation When CPR is Enabled," Joint Video Experts Team (JVET) of ITU-T SG 16 WP3 and ISO/IEC JTC 1/SC 29/WG 11, 13th Meeting, Marrakech, MA, Jan. 9-18, 2019, document JVET-M0409, 2019.
Zhao et al. "Intra Mini-Block Copy Algorithm for Screen Content Coding," Journal of Computer Applications, 2016, 36(7): 1938-1943.
Zuo et al. "Intra Block Copy for Intra-Frame Coding," Joint Video Experts Team (JVET) of ITU-T SG 16 WP 3 and ISO/IEC JTC 1/SC 29/WG 11 10th Meeting: San Diego, US, Apr. 10-20, 2018, document JVET-J0042, 2018.
Solovyev et al. "Non-CE4: Merge Mode Modification," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0056, 2018.
Yang et al. "BoG Report on CE4 Related Contributions," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0546, 2018.
Bross et al. "Versatile Video Coding (Draft 3)," Joint Video Experts Team (JVET) of ITU-T SG 16 WP 3 and ISO/IEC JTC 1/SC 29/WG 11 12th Meeting, Macao, CN, Oct. 3-12, 2018. document JVET-L1001, 2018.
Zhang et al. "AHG16: Clean-up on MV Rounding," Joint Video Experts Team (JVET) of ITU-T SG 16 WP 3 and ISO/IEC JTC 1/SC 29/WG 11, 13th Meeting, Marrakech, MA Jan. 9-18, 2019, document JVET-M0265, 2019.
Extended European Search Report from European Patent Application No. 19882864.2 dated Mar. 21, 2022 (9 pages).

\* cited by examiner

COMPONENT-DEPENDENT SUB-BLOCK DIVIDING

CROSS REFERENCE TO RELATED APPLICATIONS

This application is a continuation of International Application No. PCT/IB2019/055246, filed on Jun. 21, 2019, which claims the priority to and benefits of International Patent Application No. PCT/CN2018/092118, filed on Jun. 21, 2018, PCT/CN2018/114931, filed on Nov. 10, 2018. All the aforementioned patent applications are hereby incorporated by reference in their entireties.

TECHNICAL FIELD

This patent document is directed generally to image and video coding and decoding technologies.

BACKGROUND

Motion compensation is a technique in video processing to predict a frame in a video, given the previous and/or future frames by accounting for motion of the camera and/or objects in the video. Motion compensation can be used in the encoding and decoding of video data for video compression.

SUMMARY

Devices, systems and methods related to sub-block based prediction for image and video coding are described.

In one representative aspect, the disclosed technology may be used to provide a method for video encoding. This method includes partitioning, based on a first rule, a luma component of a block of video data into a first set of sub-blocks. The method also includes partitioning, based on a second rule, a first chroma component of the block of video data into a second set of sub-blocks. The first and the second set of sub-blocks include different numbers of sub-blocks. The method also includes performing a subsequent motion prediction based on the first and the second set of sub-blocks.

In another representative aspect, the disclosed technology may be used to provide a method for video decoding. The method includes receiving a block of video data that comprises a luma component and at least a first chroma component, processing the luma component partitioned into a first set of sub-blocks, processing the first chroma component partitioned into a second set of sub-blocks, and reconstructing the block of video data based on the processing of the luma component and the first chroma component. The first and the second set of sub-blocks include different numbers of sub-blocks.

In yet another representative aspect, the above-described method is embodied in the form of processor-executable code and stored in a computer-readable program medium.

In yet another representative aspect, a video encoder apparatus may implement a method as described herein.

In yet another representative aspect, a video decoder apparatus may implement a method as described herein.

The above and other aspects and features of the disclosed technology are described in greater detail in the drawings, the description and the claims.

DETAILED DESCRIPTION

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Figure 1:
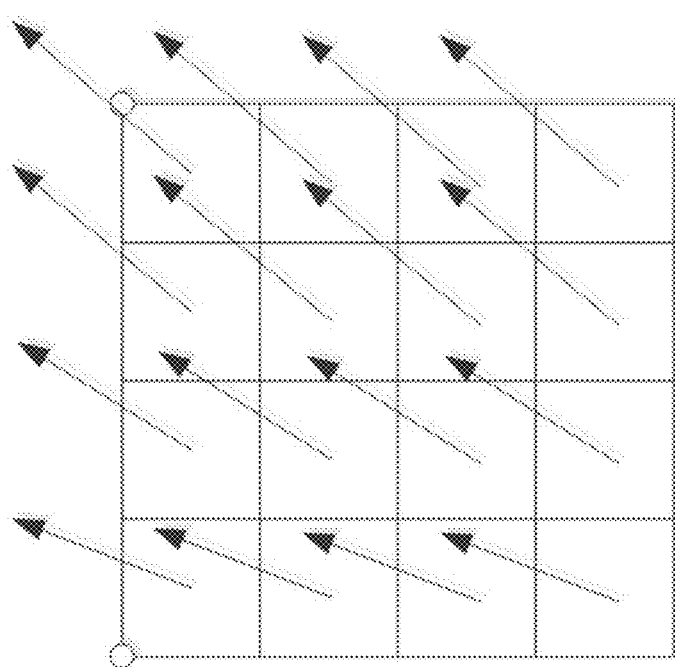
FIG. 1 shows an example of sub-block based prediction.

Sub-block based prediction is first introduced into the video coding standard by the High Efficiency Video Coding (HEVC) standard. With sub-block based prediction, a block, such as a Coding Unit (CU) or a Prediction Unit (PU), is divided into several non-overlapped sub-blocks. Different sub-blocks may be assigned different motion information, such as reference index or motion vector (MV), and motion compensation (MC) is performed individually for each sub-block. FIG. 1 shows an example of sub-block based prediction.

Embodiments of the disclosed technology may be applied to existing video coding standards (e.g., HEVC, H.265) and future standards to improve runtime performance. Section headings are used in the present document to improve readability of the description and do not in any way limit the discussion or the embodiments (and/or implementations) to the respective sections only.

Future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

Figure 2:
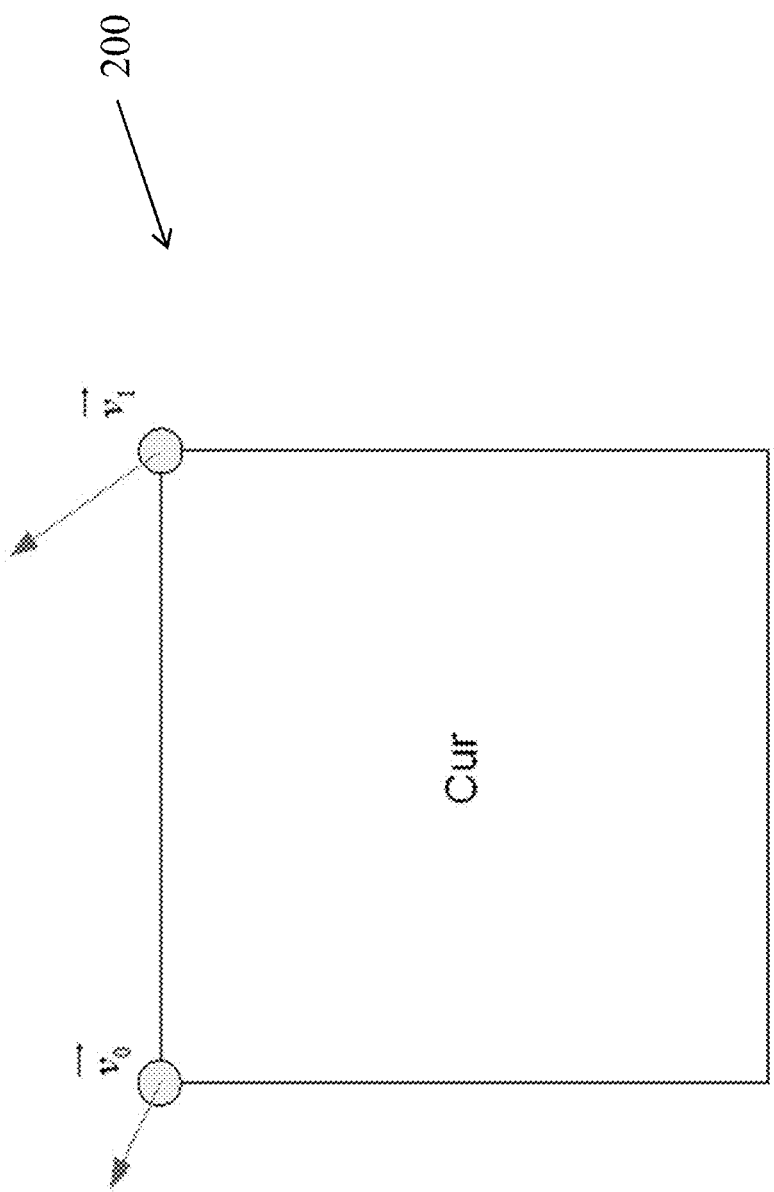
FIG. 2 shows an example of a simplified affine motion model.

In HEVC, only a translation motion model is applied for motion compensation prediction (MCP). However, the camera and objects may have many kinds of motion, e.g. zoom in/out, rotation, perspective motions, and/or other irregular motions. JEM, on the other hand, applies a simplified affine transform motion compensation prediction. FIG. 2 shows an example of an affine motion field of a block 200 described by two control point motion vectors $V_0$ and $V_1$. The motion vector field (MVF) of the block 200 can be described by the following equation:

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{e}x + \dfrac{(v_{1x} - v_{0x})}{w}y + v_{0y} \end{cases} \qquad \text{Eq. (1)}$$

Figure 3:
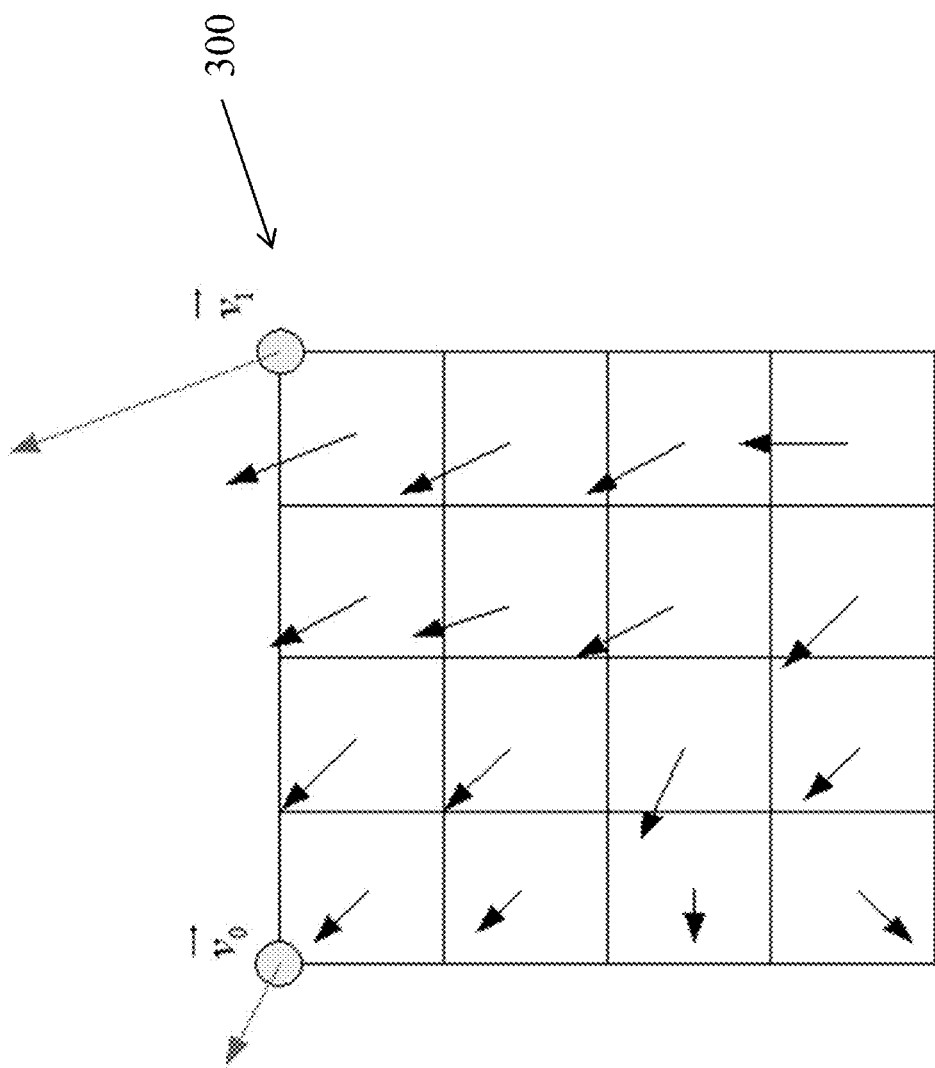
FIG. 3 shows an example of an affine motion vector field (MVF) per sub-block.

FIG. 3 shows an example of affine MVF per sub-block for a block 300. To derive motion vector of each M×N sub-block, the motion vector of the center sample of each sub-block can be calculated according to Eq. (1), and rounded to the motion vector fraction accuracy (e.g., 1/16 in JEM). Then the motion compensation interpolation filters can be applied to generate the prediction of each sub-block with derived motion vector. After the MCP, the high accuracy motion vector of each sub-block is rounded and saved as the same accuracy as the normal motion vector.

In the JEM, there are two affine motion modes: AF_INTER mode and AF_MERGE mode. For CUs with both width and height larger than 8, AF_INTER mode can be applied. An affine flag in CU level is signaled in the bitstream to indicate whether AF_INTER mode is used. In the AF_INTER mode, a candidate list with motion vector pair is constructed using the neighboring blocks. When a CU is applied in AF_MERGE mode, it gets the first block coded with an affine mode from the valid neighboring reconstructed blocks. The non-merge affine mode can be used only when the width and the height of the current block are both larger than 8; the merge affine mode can be used only when the area (i.e. width×height) of the current block is not smaller than 64.

In the Alternative Temporal Motion Vector Prediction (ATMVP) method, the temporal motion vector prediction (TMVP) method is modified by fetching multiple sets of motion information (including motion vectors and reference indices) from blocks smaller than the current CU.

Figure 4:
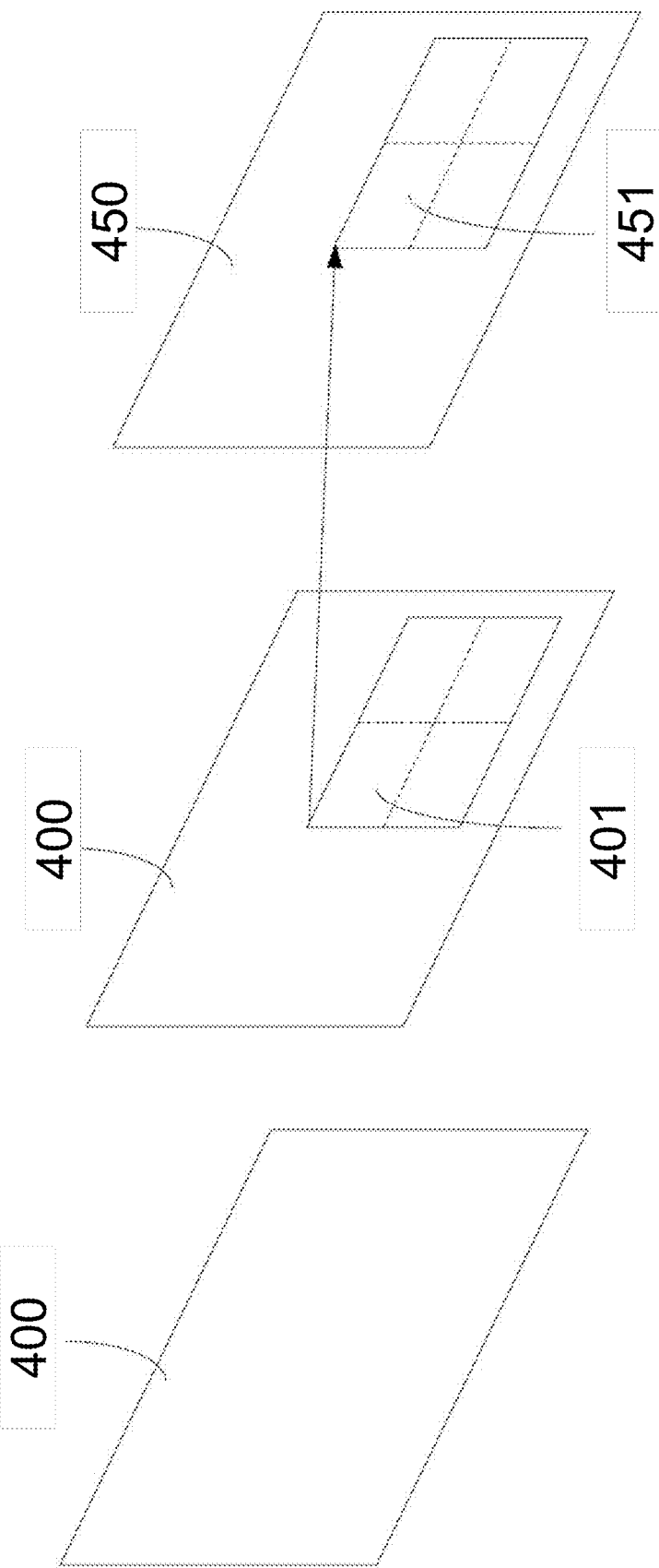
FIG. 4 shows an example of motion prediction using the alternative temporal motion vector prediction (ATMVP) algorithm for a coding unit (CU).

FIG. 4 shows an example of ATMVP motion prediction process for a CU 400. The ATMVP method predicts the motion vectors of the sub-CUs 401 within a CU 400 in two steps. The first step is to identify the corresponding block 451 in a reference picture 450 with a temporal vector. The reference picture 450 is also referred to as the motion source picture. The second step is to split the current CU 400 into sub-CUs 401 and obtain the motion vectors as well as the reference indices of each sub-CU from the block corresponding to each sub-CU.

In the first step, a reference picture 450 and the corresponding block is determined by the motion information of the spatial neighboring blocks of the current CU 400. In the second step, a corresponding block of the sub-CU 451 is identified by the temporal vector in the motion source picture 450, by adding to the coordinate of the current CU the temporal vector. For each sub-CU, the motion information of its corresponding block (e.g., the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply.

Figure 5:
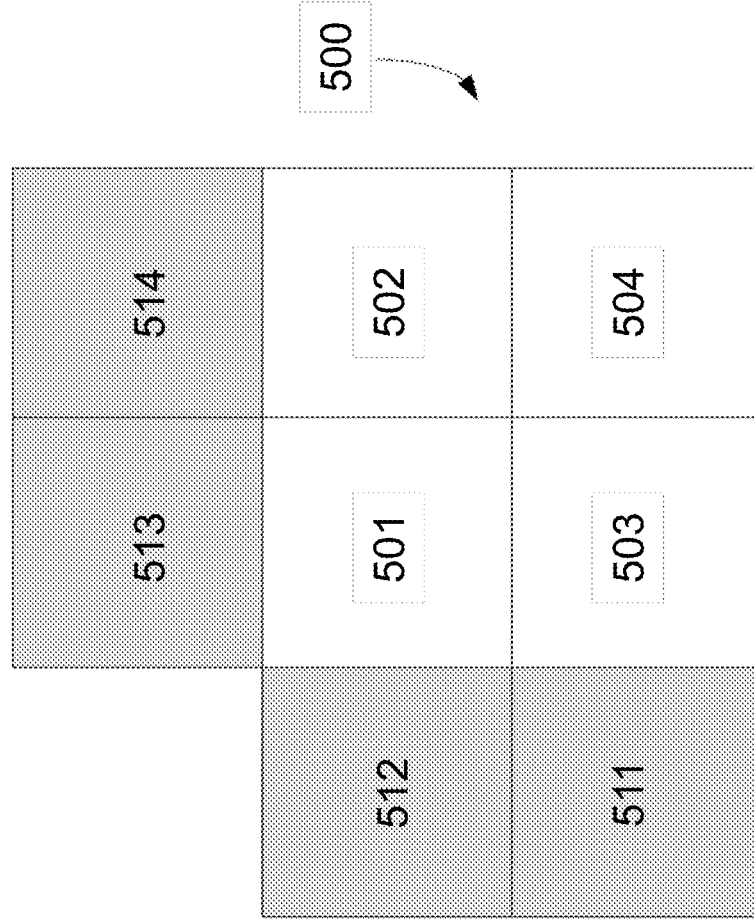
FIG. 5 shows an example of a coding unit (CU) with sub-blocks and neighboring blocks used by the spatial-temporal motion vector prediction (STMVP) algorithm.

In the Spatial-Temporal Motion Vector Prediction (STMVP) method, the motion vectors of the sub-CUs are derived recursively, following raster scan order. FIG. 5 shows an example of one CU with four sub-blocks and neighboring blocks. Consider an 8×8 CU 500 that includes four 4×4 sub-CUs A (501), B (502), C (503), and D (504). The neighboring 4×4 blocks in the current frame are labelled as a (511), b (512), c (513), and d (514).

The motion derivation for sub-CU A starts by identifying its two spatial neighbors. The first neighbor is the N×N block above sub-CU A 501 (block c 513). If this block c (513) is not available or is intra coded the other N×N blocks above sub-CU A (501) are checked (from left to right, starting at block c 513). The second neighbor is a block to the left of the sub-CU A 501 (block b 512). If block b (512) is not available or is intra coded other blocks to the left of sub-CU A 501 are checked (from top to bottom, staring at block b 512). The motion information obtained from the neighboring blocks for each list is scaled to the first reference frame for a given list. Next, temporal motion vector predictor (TMVP) of sub-block A 501 is derived by following the same procedure of TMVP derivation as specified in HEVC. The motion information of the collocated block at block D 704 is fetched and scaled accordingly. Finally, after retrieving and scaling the motion information, all available motion vectors are averaged separately for each reference list. The averaged motion vector is assigned as the motion vector of the current sub-CU.

The bi-directional optical flow (BIO) method is a sample-wise motion refinement performed on top of block-wise motion compensation for bi-prediction. In some implementations, the sample-level motion refinement does not use signaling.

Let $I^{(k)}$ be the luma value from reference k (k=0, 1) after block motion compensation, and $\partial I^{(k)}/\partial x$, $\partial I^{(k)}/\partial y$ are horizontal and vertical components of the $I^{(k)}$ gradient, respectively. Assuming the optical flow is valid, the motion vector field $(v_x, v_y)$ is given by:

$$\partial I^{(k)}/\partial t + v_x \partial I^{(k)}/\partial x + v_y \partial I^{(k)}/\partial y = 0. \qquad \text{Eq. (2)}$$

Combining this optical flow equation with Hermite interpolation for the motion trajectory of each sample results in a unique third-order polynomial that matches both the function values $I^{(k)}$ and $\partial I^{(k)}/\partial x$, $\partial I^{(k)}/\partial y$ derivatives at the ends. The value of this polynomial at t=0 is the BIO prediction:

$$\text{pred}_{BIO} = \tfrac{1}{2} \cdot (I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)). \qquad \text{Eq. (3)}$$

Figure 6:
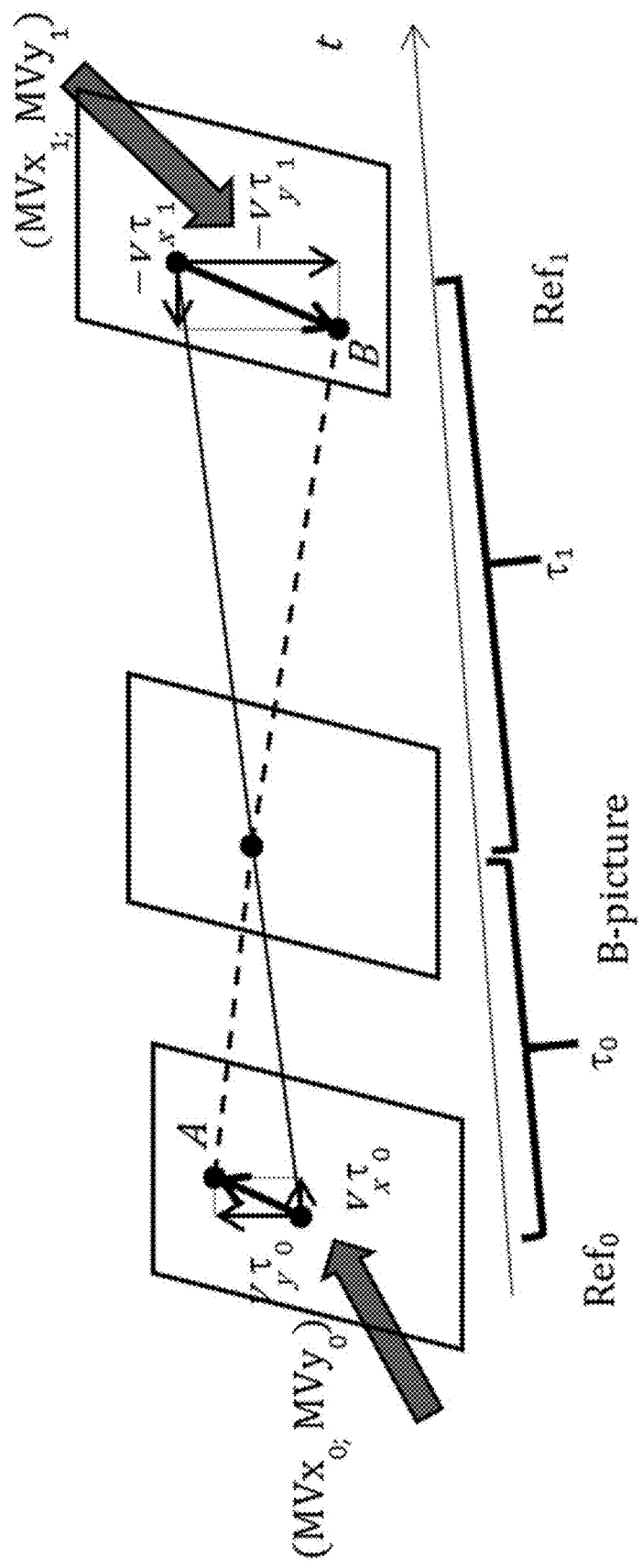
FIG. 6 shows an example of an optical flow trajectory used by the bi-directional optical flow (BIO) algorithm.

FIG. 6 shows an example optical flow trajectory in the Bi-directional Optical flow (BIO) method. Here, $\tau_0$ and $\tau_1$ denote the distances to the reference frames. Distances $\tau_0$ and $\tau_1$ are calculated based on POC for $\text{Ref}_0$ and $\text{Ref}_1$: $\tau_0 = \text{POC(current)} - \text{POC(Ref}_0)$, $\tau_1 = \text{POC(Ref}_1) - \text{POC(current)}$. If both predictions come from the same time direction (either both from the past or both from the future) then the signs are different (e.g., $\tau_0 \cdot \tau_1 < 0$). In this case, BIO is applied if the prediction is not from the same time moment (e.g., $\tau_0 \neq \tau_1$). Both referenced regions have non-zero motion (e.g., $\text{MVx}_0, \text{MVy}_0, \text{MVx}_1, \text{MVy}_1 \neq 0$) and the block motion vectors are proportional to the time distance (e.g., $\text{MVx}_0/\text{MVx}_1 = \text{MVy}_0/\text{MVy}_1 = -\tau_0/\tau_1$). In the JEM, BIO can be applied to all bi-predicted blocks when the two predictions are from different reference pictures. When Local Illumination Compensation (LIC) is enabled for a CU, BIO can be disabled.

In some cases, a frame-rate up conversion (FRUC) flag can be signaled for a CU when its merge flag is true. When the FRUC flag is false, a merge index can be signaled and the regular merge mode is used. When the FRUC flag is true, an additional FRUC mode flag can be signaled to indicate which method (e.g., bilateral matching or template matching) is to be used to derive motion information for the block.

At the encoder side, the decision on whether using FRUC merge mode for a CU is based on a Rate Distortion (RD) cost selection as done for normal merge candidate. For example, multiple matching modes (e.g., bilateral matching and template matching) are checked for a CU by using RD cost selection. The one leading to the minimal cost is further compared to other CU modes. If a FRUC matching mode is the most efficient one, FRUC flag is set to true for the CU and the related matching mode is used.

Typically, motion derivation process in FRUC merge mode has two steps: a CU-level motion search is first performed, then followed by a Sub-CU level motion refinement. At CU level, an initial motion vector is derived for the whole CU based on bilateral matching or template matching. First, a list of MV candidates is generated and the candidate that leads to the minimum matching cost is selected as the starting point for further CU level refinement. Then a local search based on bilateral matching or template matching around the starting point is performed. The MV results in the minimum matching cost is taken as the MV for the whole CU. Subsequently, the motion information is further refined at sub-CU level with the derived CU motion vectors as the starting points.

Figure 7:
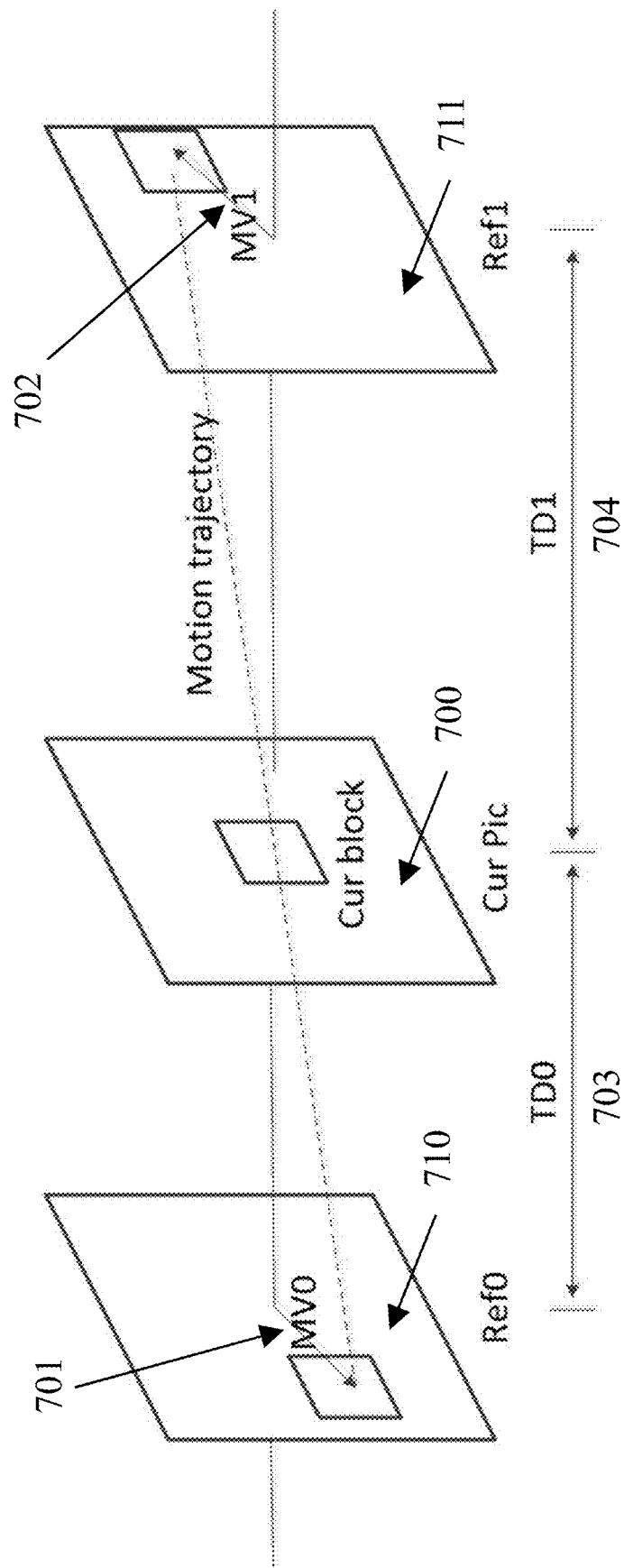
FIG. 7 shows an example of bilateral matching in the frame-rate up conversion (FRUC) algorithm.

FIG. 7 shows an example of bilateral matching used in the Frame-Rate Up Conversion (FRUC) method. The bilateral matching is used to derive motion information of the current CU by finding the closest match between two blocks along the motion trajectory of the current CU (700) in two different reference pictures (710, 711). Under the assumption of continuous motion trajectory, the motion vectors MV0 (701) and MV1 (702) pointing to the two reference blocks are proportional to the temporal distances, e.g., TD0 (703) and TD1 (704), between the current picture and the two reference pictures. In some embodiments, when the current picture 700 is temporally between the two reference pictures (710, 711) and the temporal distance from the current picture to the two reference pictures is the same, the bilateral matching becomes mirror based bi-directional MV.

Figure 8:
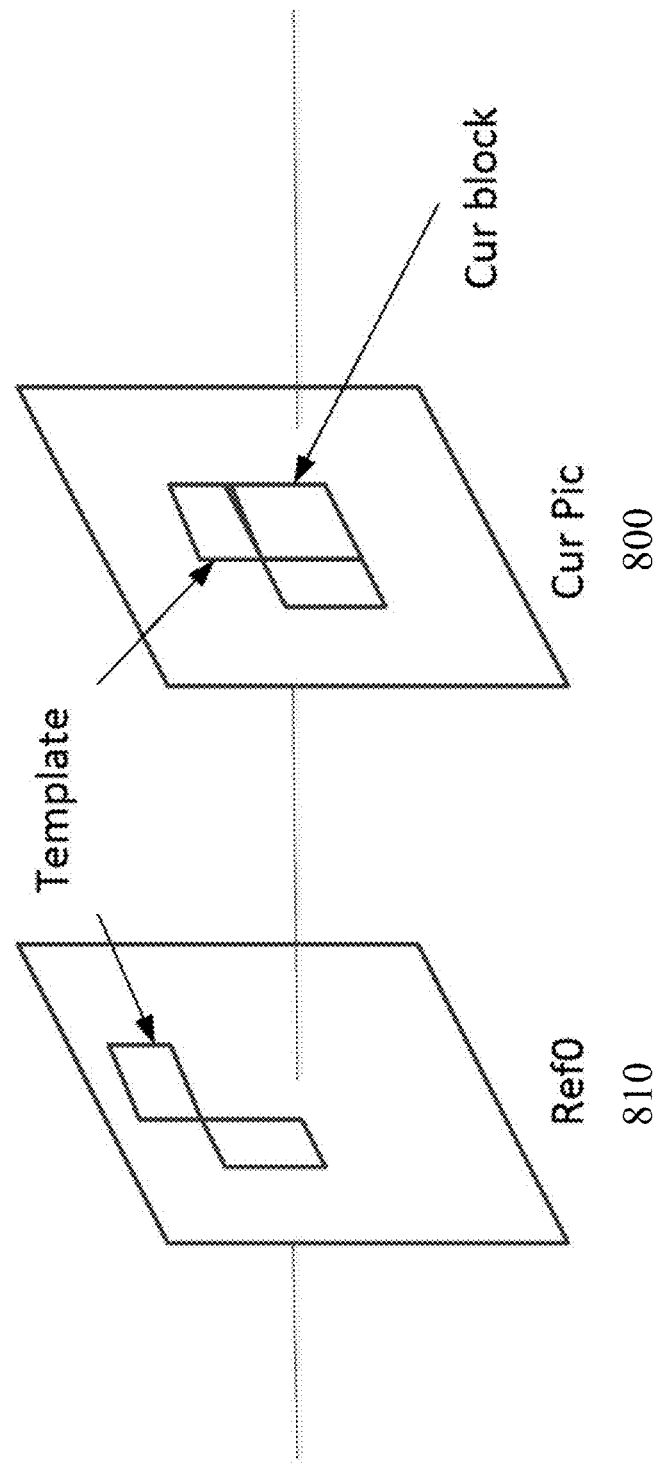
FIG. 8 shows an example of template matching in the FRUC algorithm.

FIG. 8 shows an example of template matching used in the Frame-Rate Up Conversion (FRUC) method. Template matching can be used to derive motion information of the current CU 800 by finding the closest match between a template (e.g., top and/or left neighboring blocks of the current CU) in the current picture and a block (e.g., same size to the template) in a reference picture 810. Except the aforementioned FRUC merge mode, the template matching can also be applied to AMVP mode. In both JEM and HEVC, AMVP has two candidates. With the template matching method, a new candidate can be derived. If the newly derived candidate by template matching is different to the first existing AMVP candidate, it is inserted at the very beginning of the AMVP candidate list and then the list size is set to two (e.g., by removing the second existing AMVP candidate). When applied to AMVP mode, only CU level search is applied.

Because human visual system is less sensitive to the position and motion of color than luminance, bandwidth can be optimized by storing more luminance detail than color detail. In video systems, this is achieved by using color difference components. The signal is divided into a luma (Y') component and two color difference (chroma) components. Chroma subsampling is the practice of encoding images by implementing less resolution for chroma information than for luma information, taking advantage of the human visual system's lower acuity for color differences than for luminance. For example, common types of subsampling include 4:2:2 (the two chroma components are sampled at half the sample rate of luma), 4:1:1 (the horizontal color resolution is quartered), and 4:2:0 (the vertical resolution is halved as compared to 4:1:1 because the Cb and Cr channels are only sampled on each alternate line).

Figure 9:
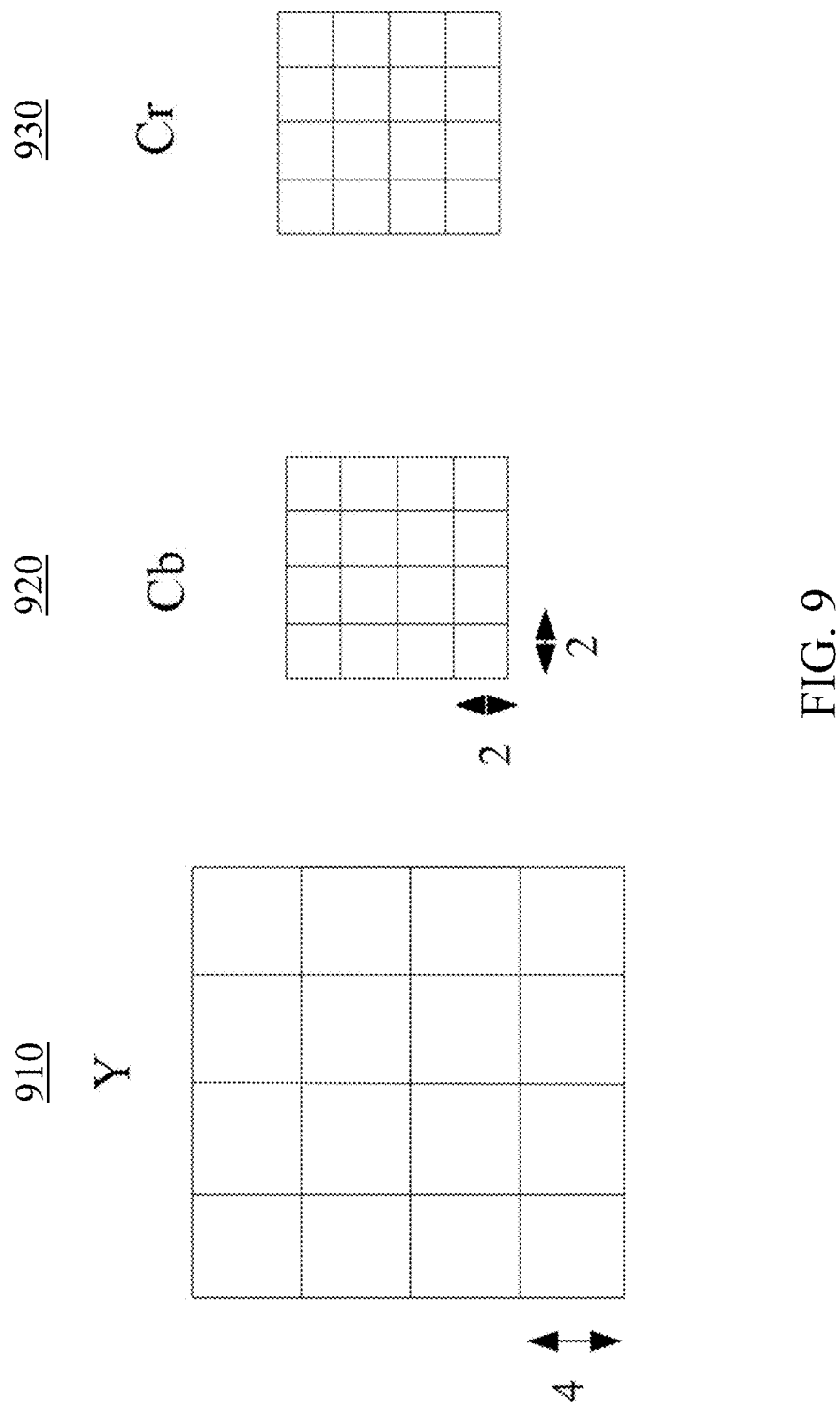
FIG. 9 shows an example of sub-blocks for different components with the 4:2:0 format in JEM.

Because human visual system's sensitivity towards luminance, in some existing implementations, the sub-block size is primarily determined based on the luma component. For example, in JEM, the size of sub-blocks is 2×2 for the chroma components with the 4:2:0 format; the size of sub-blocks is 2×4 for the chroma components with the 4:2:2 format. FIG. 9 shows an example of sub-blocks of a for different components with the 4:2:0 format in JEM. In this example, the block size is 16×16 for Y (luma component 910) and 8×8 for Cb/Cr (chroma components 920, 930). The sub-block size of the luma component is 4×4, while the sub-block size of the chroma components is 2×2. The small size of sub-blocks in the chroma components imposes higher band-width requirements.

This patent document describes techniques that can be implemented in various embodiments to reduce band-width requirement by having variable sub-block sizes depending on different components. In the following embodiments, which should not be construed to be limiting, the width and height of the current block for a component are noted as W and H respectively, the width and height of the sub-block assigned to the component are noted as w and h respectively.

Figure 10:
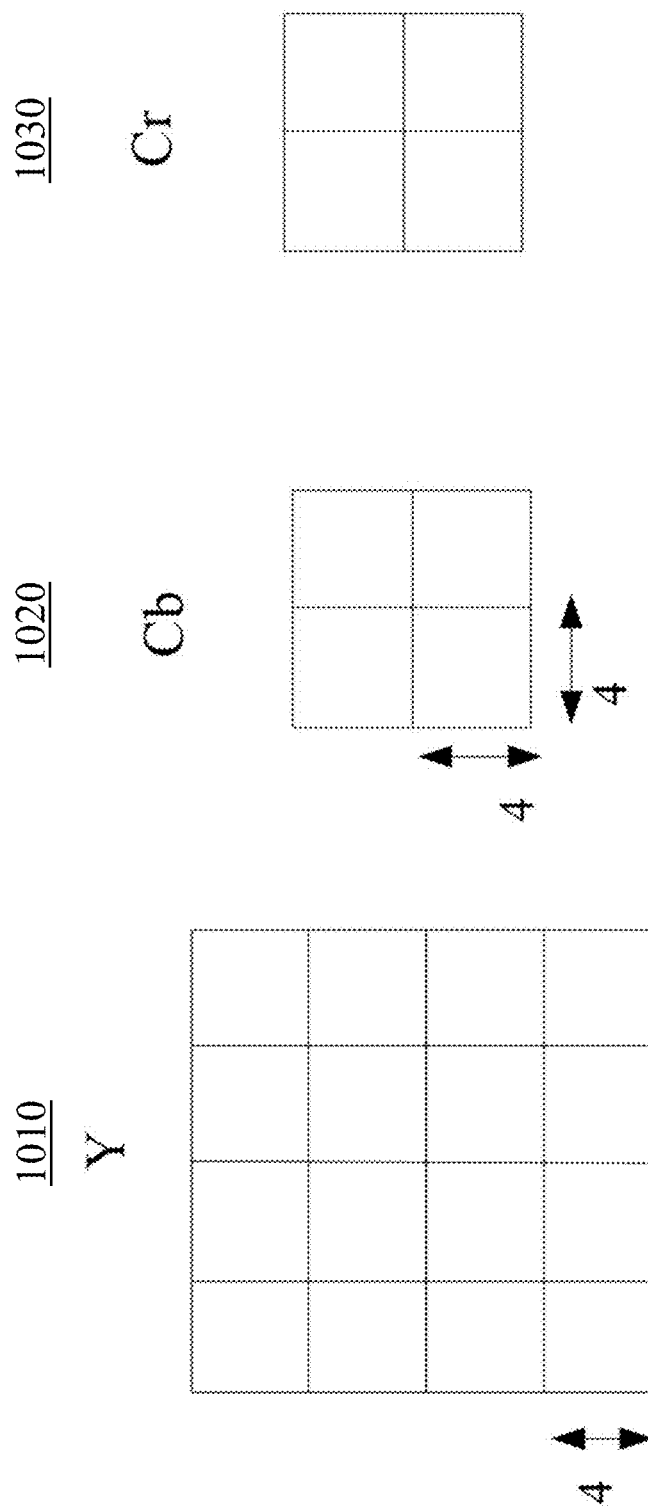
FIG. 10 shows an example of sub-blocks for different components with the 4:2:0 format in accordance with the disclosed technology.

Instead of deriving sub-block sizes based on the luma component primarily, one block of video data can be divided into sub-blocks in different ways depending on the color components, the color format, and/or block shape and size, thereby increasing the sub-block sizes of the chroma components and alleviating band-width requirements for such information. For a luma block and its corresponding chroma blocks, the number of divided sub-blocks may be different for different color components while the sizes of sub-blocks in different components remain the same. For example, for the 4:2:0 color format, one luma block having M×N sub-blocks can correspond to one Cb block having M/2×N/2 sub-blocks and one Cr block having M/2×N/2 sub-blocks. FIG. 10 shows an example of proposed sub-blocks of a 16×16 block for the luma component and 8×8 blocks for Cb and Cr components (1020 and 1030) in accordance with one or more embodiments of the present technology. The sub-block sizes for different components are the same in this specific example: w=4 and h=4. The number of divided sub-blocks for the luma component (1010) is 16 (M=4 and N=4), while the number of divided sub-blocks for the Cb and Cr chroma components is 4 (=M/2×N/2). In some embodiments, when w>W or h>H, the block is not divided further into sub-blocks for that component.

Figure 11:
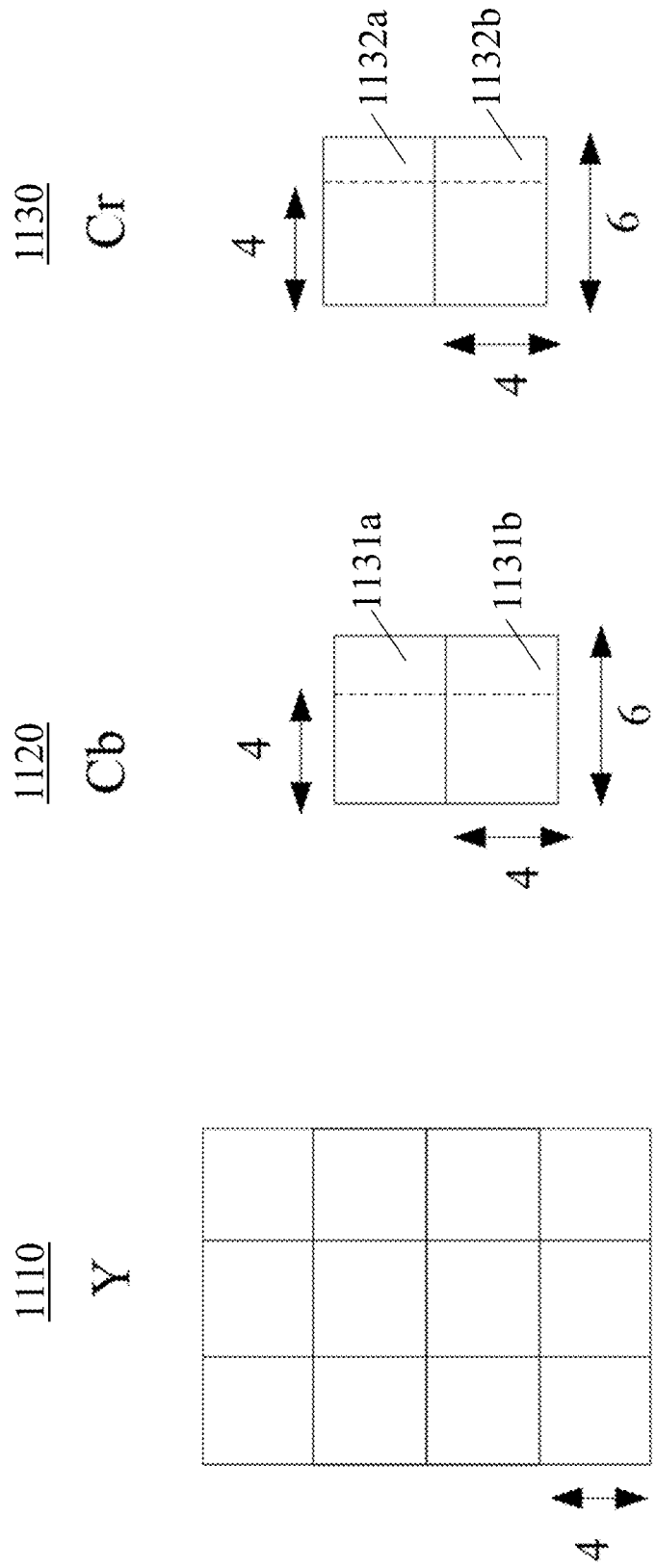
FIG. 11 shows another example of sub-blocks for different components with the 4:2:0 format in accordance with the disclosed technology.

In some embodiments, different sub-block sizes within one block can be allowed. When W (or H) is not an integer multiple of w (or h), the sub-blocks can be merged into its adjacent left or above sub-block, resulting in different sub-block sizes within one block. For example, as shown in FIG. 11, the block size for the luma component (1110) is 12×16, while the block sizes for the chroma components (1120, 1130) are 6×8. The blocks are divided into sub-blocks respectively. The sub-block size for the luma component is 4×4. Because W (=6) for the chroma components is not an integer multiple of w (=4), the size of last sub-blocks 1131a, 1131b, 1132a, 1132b is 2×4, and they are merged to their left neighboring blocks, forming sub-blocks having a size of 4×6 in the chroma components.

Figure 12:
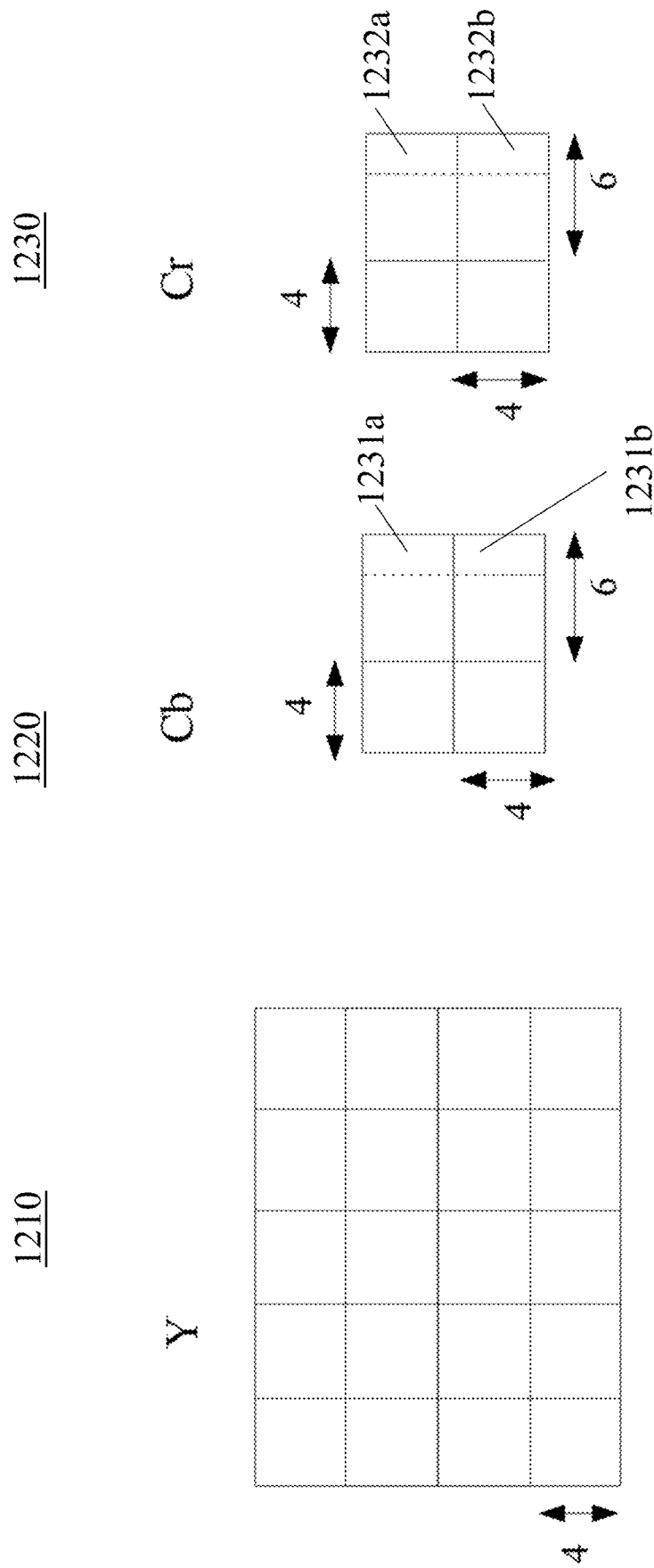
FIG. 12 shows yet another example of sub-blocks for different components with the 4:2:0 format in accordance with the disclosed technology.

FIG. 12 shows another example of having different sub-block sizes within one block in accordance with one or more embodiments of the present technology. In this example, the block size for the luma component (1210) is 20×16, while the block size for the chroma components (1220, 1230) are 10×8. The blocks are divided into sub-blocks respectively. The sub-block size for the luma component is 4×4. Because W (=10) for the chroma components is not an integer multiple of w (=4), the size of last sub-blocks 1231a, 1231b, 1232a, 1232b is 2×4, so they are merged to their left neighboring blocks. The chroma components thus have different sub-block sizes that include both 4×4 and 6×4.

In some embodiments, the sub-block sizes can depend on the block shape. For example, for square blocks (W=H), the sub-blocks can also have square shapes (w=h). As another example, for non-square blocks such as rectangular blocks (W≠H), the sub-blocks are also non-square (i.e., rectangular) (w≠h). As another example, when W>H, w is set to be larger than h, and versa vice.

In some embodiments, sub-block size of the luma component and sub-block sizes of the chroma components can be determined in different ways. For example, the sub-block size of the luma (Y) component can be adaptively determined based a candidate set, such as {4×4, 8×8, 4×8, 8×4}. However, the sub-block size of the chroma components (Cb/Cr) is fixed to be 4×4. Alternatively, the sub-block size of the chroma components can also be determined based on sizes in a candidate set.

In some embodiments, sub-block sizes of luma component and chroma components can depend on the color/subsampling formats, such as 4:2:0, 4:2:2 and 4:4:4. Sub-block sizes of different color components or different block shapes can be signaled in sequence parameter set (SPS), picture parameter set (PPS), or slice header from the encoder to the decoder.

Figure 13:
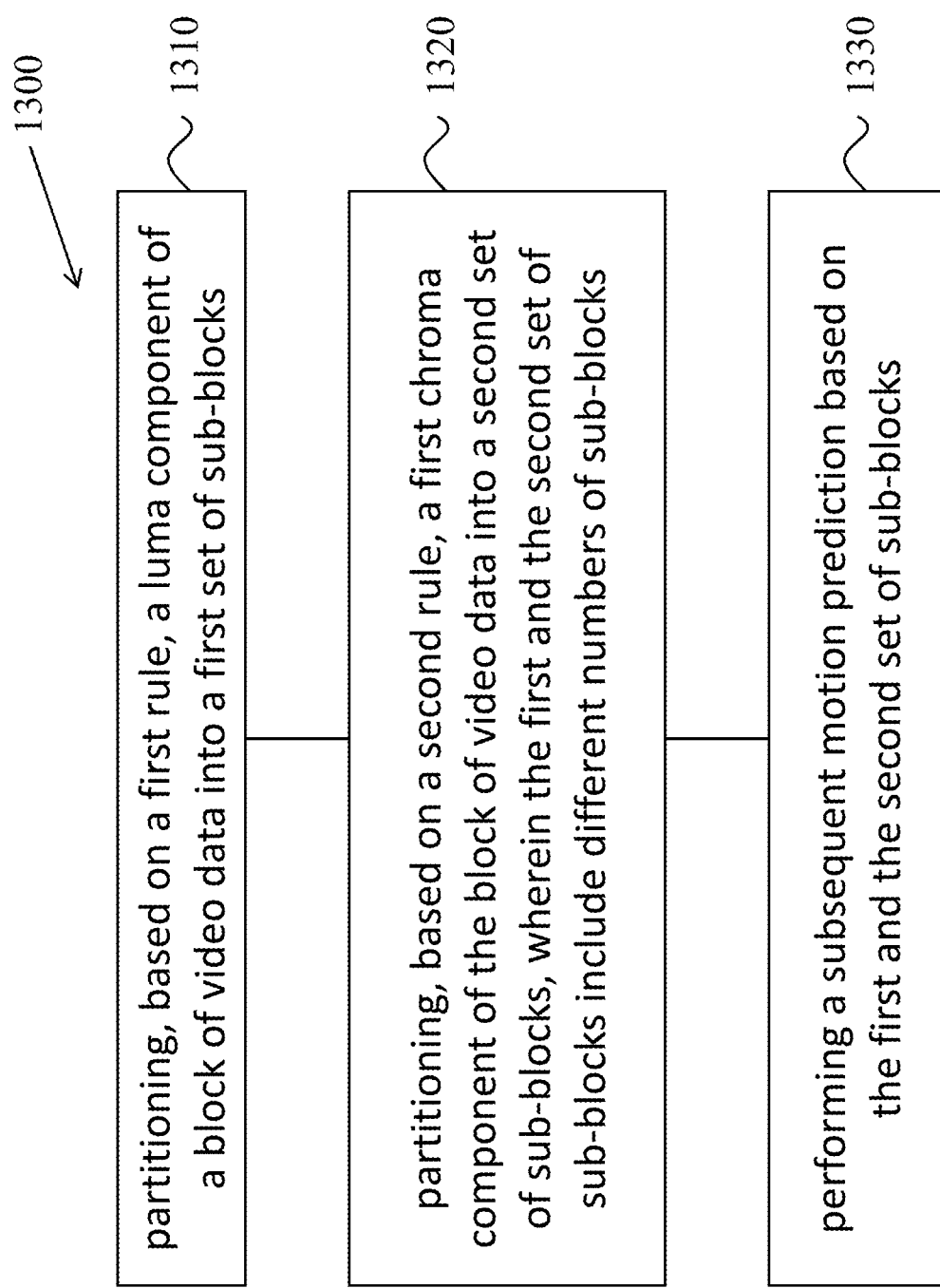
FIG. 13 shows a flowchart of an example method for sub-block based prediction in accordance with the disclosed technology.

FIG. 13 shows a flowchart of an example method 1300 for sub-block based prediction in accordance with the disclosed technology. The method 1300 includes, at operation 1310, partitioning, based on a first rule, a luma component of a block of video data into a first set of sub-blocks. The method 1300 includes, at operation 1320, partitioning, based on a second rule, a first chroma component of the block of video data into a second set of sub-blocks, wherein the first and the second set of sub-blocks include different numbers of sub-blocks. The method 1300 includes, at operation 1330, performing a subsequent motion prediction based on the first and the second set of sub-blocks. In some embodiments, the method further includes partitioning, based on a third rule, a second chroma component of the block of video data into a third set of sub-blocks, wherein the first and the third set of sub-blocks include different numbers of sub-blocks.

In some embodiments, dimensions of the first set of sub-blocks are same as dimensions of the second set of sub-blocks. In some embodiments, dimensions of the second set of sub-blocks are same as dimensions of the third set of sub-blocks. In some embodiments, the subsequent motion prediction includes at least one of an affine prediction, a bi-directional optical flow (BIO) prediction, an alternative temporal motion vector prediction (ATMVP), or a temporal motion vector prediction (TMVP). In some embodiments, the dimensions of the first, second, and third set of subblocks are 4×4.

In some embodiments, dimensions of the first set of sub-blocks are at least partially different from dimensions of the second set of sub-blocks. In some embodiments, dimensions of the first set of sub-blocks are at least partially different from dimensions of the third set of sub-blocks.

In some embodiments, the method includes refraining from partitioning the block of video data upon determining that a dimension of a sub-block is greater than a corresponding dimeson of the block. In some embodiments, the method includes determining a first sub-block size for the partitioning of the block of video data; dividing a component of the block using the first sub-block size; and merging a remaining portion of the component with a neighboring sub-block of the remaining portion such that the neighboring sub-block has a second sub-block size different than the first sub-block size.

In some embodiments, the first rule and the second rule comprise determining dimensions of sub-blocks based on dimensions of the block of video data. For example, the block of video data has a square shape indicates that sub-blocks have a square shape. As another example, the block of video data has a non-square shape indicates that sub-blocks have a non-square shape. In some embodiments, the method includes signaling dimensions of sub-blocks in a sequence parameter set (SPS), a picture parameter set (PPS) or a slice header.

In some embodiments, the first rule is different than the second rule or the third rule. In some embodiments, the first rule includes adaptively selecting a sub-block size for the luma component from a set of candidate sizes. The second rule or the third rule comprises setting a fixed sub-block size for the second or the third set of sub-blocks.

In some embodiments, the first rule, the second rule, or the third rule comprises determining dimensions of the first, the second, or the third set of sub-blocks based on a subsampling format of the block of video data.

Figure 14:
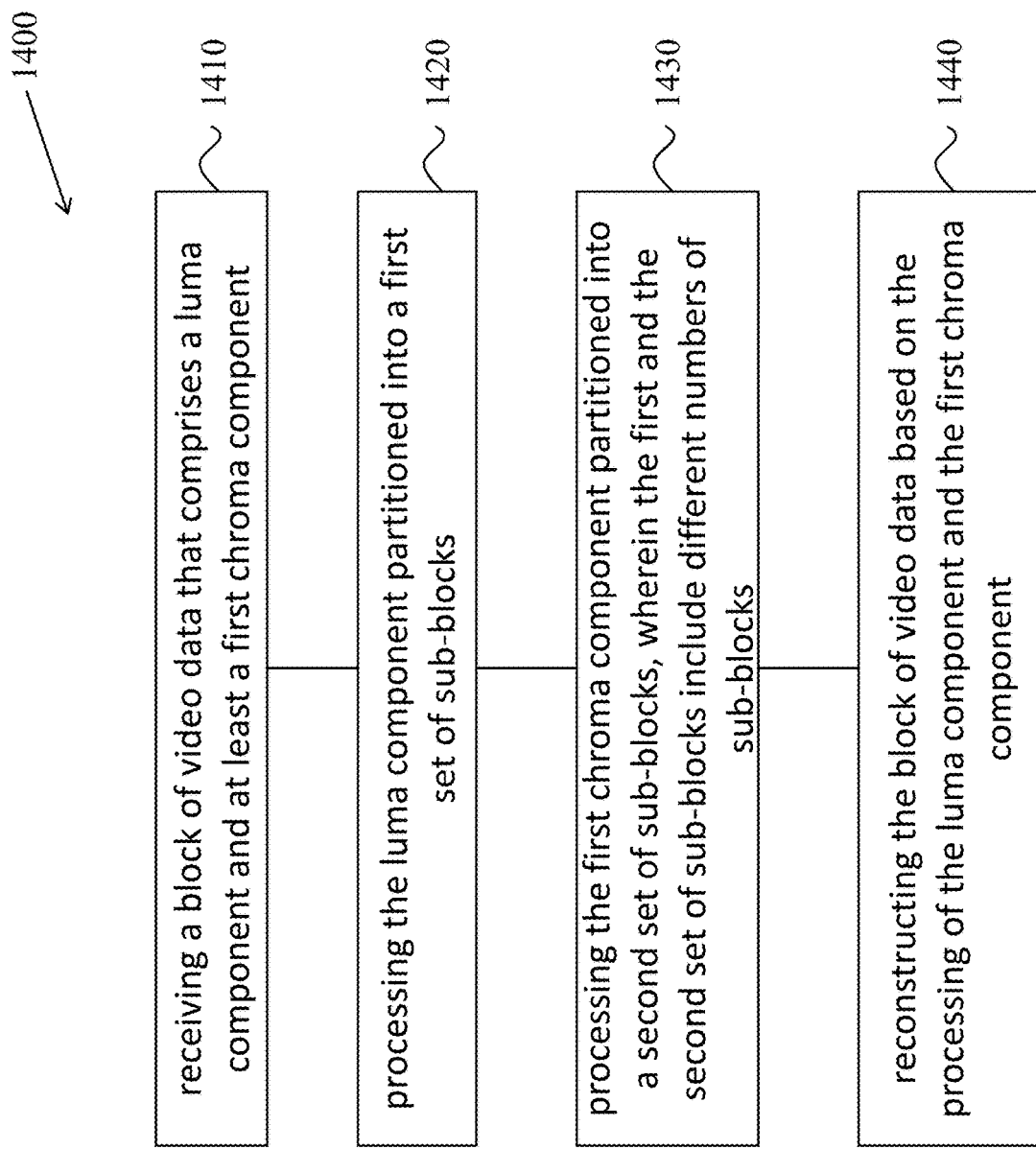
FIG. 14 shows a flowchart of another example method for sub-block based prediction in accordance with the disclosed technology.

FIG. 14 shows a flowchart of another example method 1400 for sub-block based prediction in accordance with the disclosed technology. The method 1400 includes, at operation 1410, receiving a block of video data that comprises a luma component and at least a first chroma component. The method 1400 includes, at operation 1420, processing the luma component partitioned into a first set of sub-blocks. The method 1400 includes, at operation 1430, processing the first chroma component partitioned into a second set of sub-blocks, wherein the first and the second set of sub-blocks include different numbers of sub-blocks. The method 1400 also includes, at operation 1440, reconstructing the block of video data based on the processing of the luma component and the first chroma component.

In some embodiments, the block of video data comprises a second chroma component. The method further comprises processing the second chroma component partitioned into a third set of sub-blocks, wherein the first and the third set of sub-blocks include different numbers of sub-blocks.

In some embodiments, dimensions of the first set of sub-blocks are same as dimensions of the second set of sub-blocks. In some embodiments, dimensions of the second set of sub-blocks are same as dimensions of the third set of sub-blocks.

In some embodiments, the reconstructing of the block of video data comprises applying a motion prediction that includes at least one of an affine prediction, a bi-directional optical flow (BIO) prediction, an alternative temporal motion vector prediction (ATMVP), or a temporal motion vector prediction (TMVP). In some embodiments, the dimensions of the first, second, and third set of subblocks are 4×4.

In some embodiments, dimensions of the first set of sub-blocks are at least partially different from dimensions of the second set of sub-blocks. In some embodiments, dimensions of the first set of sub-blocks are at least partially different from dimensions of the third set of sub-blocks.

In some embodiments, dimensions of sub-blocks are determined based on dimensions of the block of video data. For example, the block of video data has a square shape indicates that sub-blocks have a square shape. As another example, the block of video data has a non-square shape indicates that sub-blocks have a non-square shape.

In some embodiments, the method includes receiving dimensions of sub-blocks in a sequence parameter set (SPS), a picture parameter set (PPS) or a slice header. In some embodiments, a sub-block size for the luma component is adaptively selected from a set of candidate sizes. A fixed sub-block size is used for the second or the third set of sub-blocks. In some embodiments, dimensions of the first, the second, or the third set of sub-blocks are determined based on a subsampling format of the block of video data.

The examples described above may be incorporated in the context of the methods described below, e.g., methods 1300 and 1400, which may be implemented at a video decoder and/or video encoder.

Figure 15:
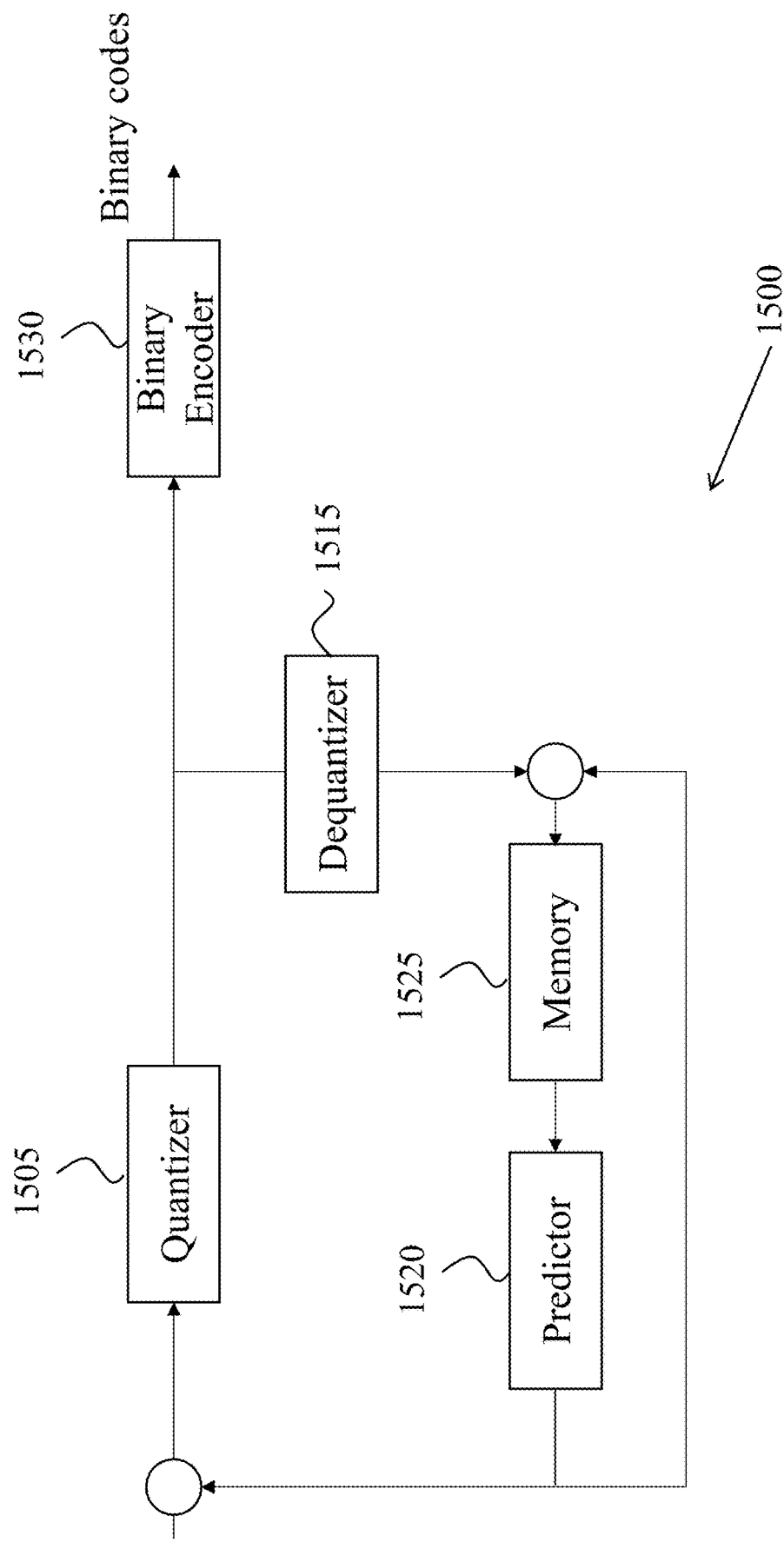
FIG. 15 is a block diagram illustrating an example encoding apparatus that can be utilized to implement various portions of the presently disclosed technology.

FIG. 15 is a block diagram illustrating an example encoding apparatus 1500 that can be utilized to implement various portions of the presently disclosed technology, including (but not limited to) method 1300 and method 1400. The encoding apparatus 1500 includes a quantizer 1505 for compressing input data bits. The encoding apparatus 1500 also includes a dequantizer 1515 so that data bits can be fed into memory 1525 and predictor 1520 to perform motion estimation. The encoding apparatus 1500 further includes a binary encoder 1530 to generated encoded binary codes.

Figure 16:
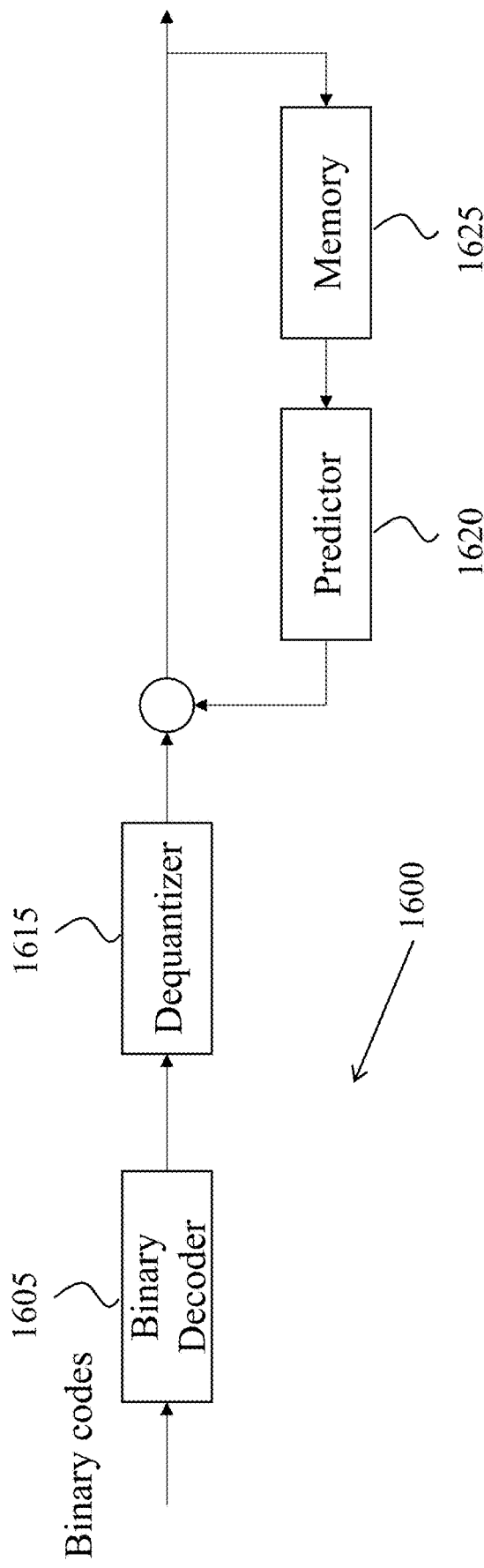
FIG. 16 is a block diagram illustrating an example encoding apparatus that can be utilized to implement various portions of the presently disclosed technology.

FIG. 16 is a block diagram illustrating an example encoding apparatus 1600 that can be utilized to implement various portions of the presently disclosed technology, including (but not limited to) method 1300 and method 1400. The decoding apparatus 1600 includes a bindery decoder 1605 to decode the binary codes. The decoding apparatus 1600 also includes a dequantizer 1615 so that decoded data bits can be fed into memory 1625 and predictor 1620 to perform motion estimation on the decoding side.

Figure 17:
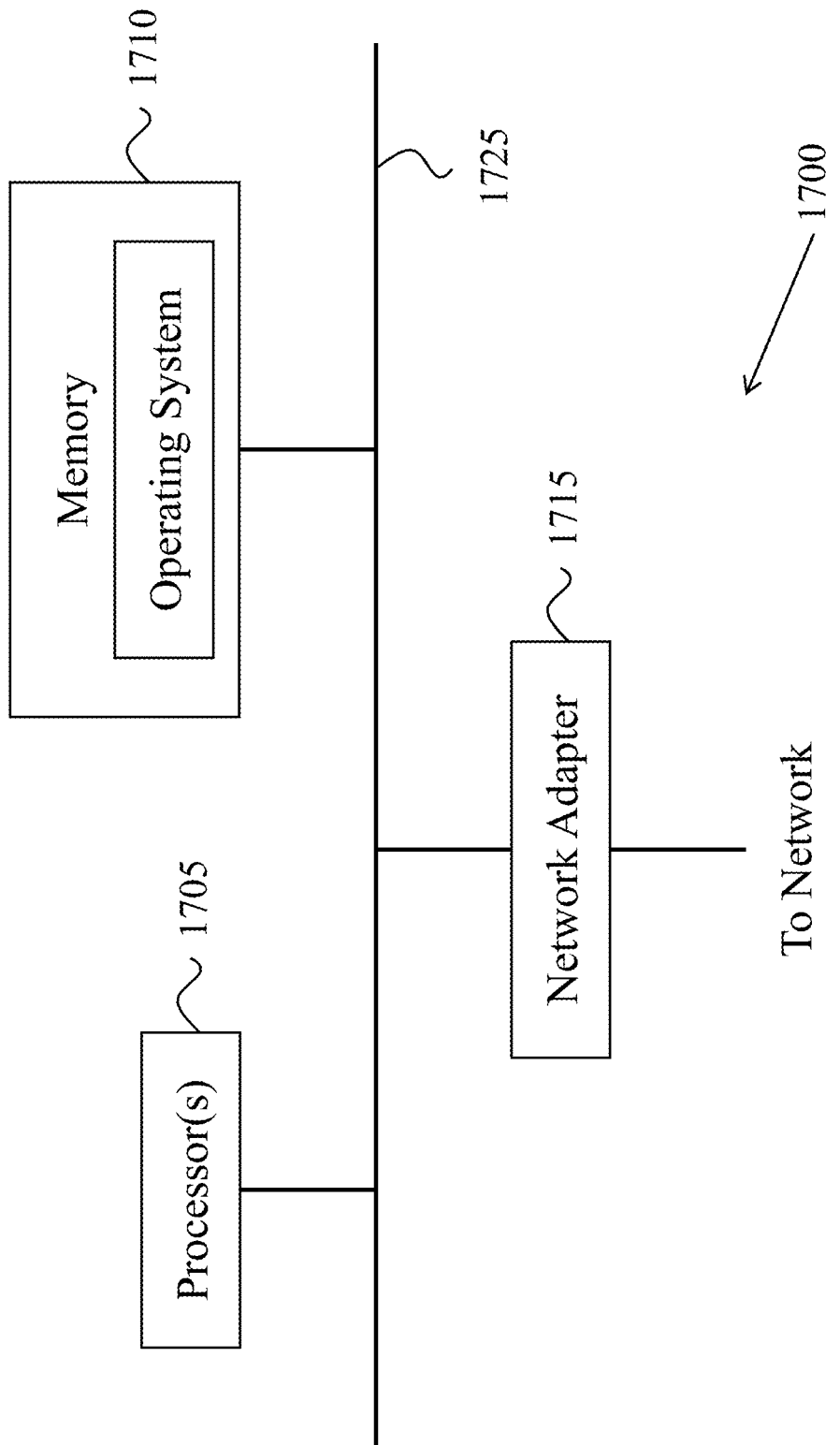
FIG. 17 is a block diagram illustrating an example of the architecture for a computer system or other control device that can be utilized to implement various portions of the presently disclosed technology.

FIG. 17 is a block diagram illustrating an example of the architecture for a computer system or other control device 1700 that can be utilized to implement various portions of the presently disclosed technology, including (but not limited to) method 1300 and method 1400. In FIG. 17, the computer system 1700 includes one or more processors 1705 and memory 1710 connected via an interconnect 1725. The interconnect 1725 may represent any one or more separate physical buses, point to point connections, or both, connected by appropriate bridges, adapters, or controllers. The interconnect 1725, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 1705 may include central processing units (CPUs) to control the overall operation of, for example, the host computer. In certain embodiments, the processor(s) 1705 accomplish this by executing software or firmware stored in memory 1710. The processor(s) 1705 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 1710 can be or include the main memory of the computer system. The memory 1710 represents any suitable form of random access memory (RAM), read-only memory (ROM), flash memory, or the like, or a combination of such devices. In use, the memory 1710 may contain, among other things, a set of machine instructions which, when executed by processor 1705, causes the processor 1705 to perform operations to implement embodiments of the presently disclosed technology.

Also connected to the processor(s) 1705 through the interconnect 1725 is a (optional) network adapter 1715. The network adapter 1715 provides the computer system 1700 with the ability to communicate with remote devices, such as the storage clients, and/or other storage servers, and may be, for example, an Ethernet adapter or Fiber Channel adapter.

Figure 18:
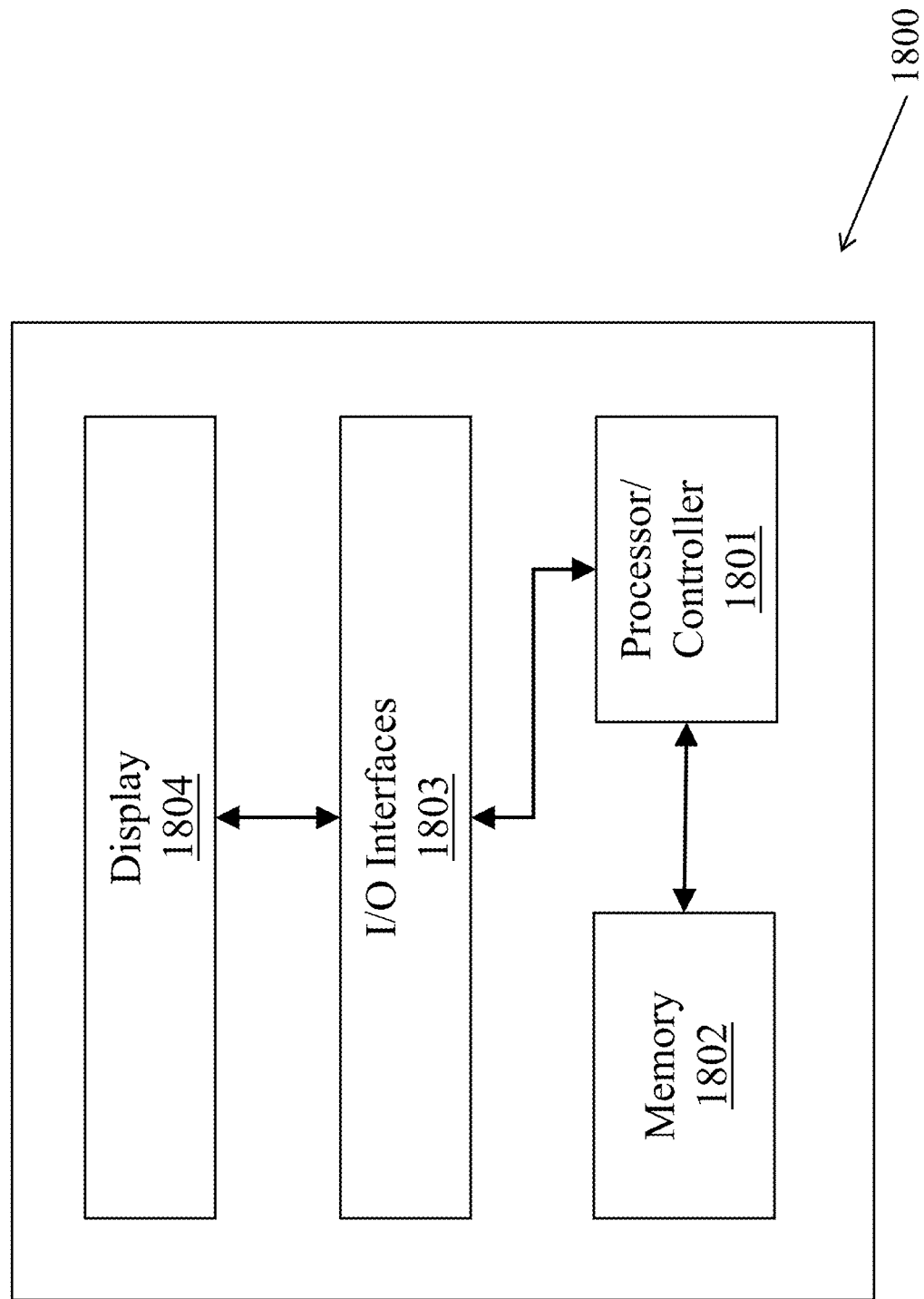
FIG. 18 shows a block diagram of an example embodiment of a mobile device that can be utilized to implement various portions of the presently disclosed technology.

FIG. 18 shows a block diagram of an example embodiment of a mobile device 1800 that can be utilized to implement various portions of the presently disclosed technology, including (but not limited to) method 1600. The mobile device 1800 can be a laptop, a smartphone, a tablet, a camcorder, or other types of devices that are capable of processing videos. The mobile device 1800 includes a processor or controller 1801 to process data, and memory 1802 in communication with the processor 1801 to store and/or buffer data. For example, the processor 1801 can include a central processing unit (CPU) or a microcontroller unit (MCU). In some implementations, the processor 1801 can include a field-programmable gate-array (FPGA). In some implementations, the mobile device 1800 includes or is in communication with a graphics processing unit (GPU), video processing unit (VPU) and/or wireless communications unit for various visual and/or communications data processing functions of the smartphone device. For example, the memory 1802 can include and store processor-executable code, which when executed by the processor 1801, configures the mobile device 1800 to perform various operations, e.g., such as receiving information, commands, and/or data, processing information and data, and transmitting or providing processed information/data to another device, such as an actuator or external display.

To support various functions of the mobile device 1800, the memory 1802 can store information and data, such as instructions, software, values, images, and other data processed or referenced by the processor 1801. For example, various types of Random Access Memory (RAM) devices, Read Only Memory (ROM) devices, Flash Memory devices, and other suitable storage media can be used to implement storage functions of the memory 1802. In some implementations, the mobile device 1800 includes an input/output (I/O) unit 1803 to interface the processor 1801 and/or memory 1802 to other modules, units or devices. For example, the I/O unit 1803 can interface the processor 1801 and memory 1802 with to utilize various types of wireless interfaces compatible with typical data communication standards, e.g., such as between the one or more computers in the cloud and the user device. In some implementations, the mobile device 1800 can interface with other devices using a wired connection via the I/O unit 1803. The mobile device 1800 can also interface with other external interfaces, such as data storage, and/or visual or audio display devices 1804, to retrieve and transfer data and information that can be processed by the processor, stored in the memory, or exhibited on an output unit of a display device 1804 or an external device. For example, the display device 1804 can display a video frame that includes a block (a CU, PU or TU) that applies the intra-block copy based on whether the block is encoded using a motion compensation algorithm, and in accordance with the disclosed technology.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of coding video data, comprising:
   determining, during a conversion between a luma block of a video and a bitstream of the video, that motion vectors of control points of the luma block based on an affine mode;
   dividing the luma block into a first group of sub-blocks, wherein each sub-block of the first group has a first size;
   reconstructing a first group of sub-blocks of the luma block based on the motion vectors of the control points; and
   reconstructing a second group of sub-blocks of a chroma block corresponding to the luma block, wherein each sub-block of the second group has a second size, and the second size is equal to the first size in a case that a color format applied for the luma block and the chroma block is 4:2:0 or 4:2:2,
   wherein a number of sub-blocks of the second group is different from a number of sub-blocks of the first group in a case that the color format is 4:2:0 or 4:2:2,
   wherein motion information of each of the first group of sub-blocks is derived based on the motion vectors of the control points.

2. The method of claim 1, wherein the first size and second size are equal to 4*4.

3. The method of claim 1, wherein a number of the control points is 2.

4. The method of claim 1, wherein the control points include a top-left control point and a top-right control point.

5. The method of claim 1, wherein a number of the control points is 3.

6. The method of claim 1, wherein the control points include a top-left control point, a top-right control point and a bottom-left corner control point.

7. The method of claim 1, wherein the conversion includes encoding a current video block of the video into the bitstream, wherein the current video block includes the luma block and the chroma block.

8. The method of claim 1, wherein the conversion includes decoding a current video block of the video from the bitstream, wherein the current video block includes the luma block and the chroma block.

9. An apparatus for coding video data comprising a processor and a non-transitory memory with instructions thereon, wherein the instructions upon execution by the processor, cause the processor to:
   determine, during a conversion between a luma block of a video and a bitstream of the video, that motion vectors of control points of the luma block based on an affine mode;
   divide the luma block into a first group of sub-blocks, wherein each sub-block of the first group has a first size;
   reconstruct a first group of sub-blocks of the luma block based on the motion vectors of the control points; and
   reconstruct a second group of sub-blocks of a chroma block corresponding to the luma block, wherein each sub-block of the second group has a second size, and the second size is equal to the first size in a case that a color format applied for the luma block and the chroma block is 4:2:0 or 4:2:2,
   wherein a number of sub-blocks of the second group is different from a number of sub-blocks of the first group in a case that the color format is 4:2:0 or 4:2:2,
   wherein motion information of each of the first group of sub-blocks is derived based on the motion vectors of the control points.

10. The apparatus of claim 9, wherein the first size and second size are equal to 4*4.

11. The apparatus of claim 9, wherein a number of sub-blocks of the second group is different from a number of sub-blocks of the first group in a case that the color format is 4:2:0 or 4:2:2.

12. The apparatus of claim 9, wherein a number of the control points is 2.

13. The apparatus of claim 9, wherein the control points include a top-left control point and a top-right control point.

14. The apparatus of claim 9, wherein a number of the control points is 3.

15. The apparatus of claim 9, wherein the control points include a top-left control point, a top-right control point and a bottom-left corner control point.

16. The apparatus of claim 9, wherein the conversion includes encoding a current video block of the video into the bitstream, wherein the current video block includes the luma block and the chroma block.

17. The apparatus of claim 9, wherein the conversion includes decoding a current video block of the video from the bitstream, wherein the current video block includes the luma block and the chroma block.

18. A non-transitory computer-readable storage medium storing instructions that cause a processor to:
   determine, during a conversion between a luma block of a video and a bitstream of the video, that motion vectors of control points of the luma block based on an affine mode;
   divide the luma block into a first group of sub-blocks, wherein each sub-block of the first group has a first size;
   reconstruct a first group of sub-blocks of the luma block based on the motion vectors of the control points; and
   reconstruct a second group of sub-blocks of a chroma block corresponding to the luma block, wherein each sub-block of the second group has a second size, and the second size is equal to the first size in a case that a color format applied for the luma block and the chroma block is 4:2:0 or 4:2:2,
   wherein a number of sub-blocks of the second group is different from a number of sub-blocks of the first group in a case that the color format is 4:2:0 or 4:2:2,
   wherein motion information of each of the first group of sub-blocks is derived based on the motion vectors of the control points.

19. A non-transitory computer-readable recording medium storing a bitstream which is generated by a method performed by a video processing apparatus, wherein the method comprises:
- determining, during a conversion between a luma block of a video and a bitstream of the video, that motion vectors of control points of the luma block based on an affine mode;
- dividing the luma block into a first group of sub-blocks, wherein each sub-block of the first group has a first size;
- reconstructing a first group of sub-blocks of the luma block based on the motion vectors of the control points;
- reconstructing a second group of sub-blocks of a chroma block corresponding to the luma block, wherein each sub-block of the second group has a second size, and the second size is equal to the first size in a case that a color format applied for the luma block and the chroma block is 4:2:0 or 4:2:2; and
- generating the bitstream from a current video block, wherein the current video block includes the luma block and the chroma block,
- wherein a number of sub-blocks of the second group is different from a number of sub-blocks of the first group in a case that the color format is 4:2:0 or 4:2:2,
- wherein motion information of each of the first group of sub-blocks is derived based on the motion vectors of the control points.

* * * * *